US012591647B2

(12) United States Patent (10) Patent No.: US 12,591,647 B2
Zhang (45) Date of Patent: Mar. 31, 2026

(54) DEVICE STARTING SYSTEM AND METHOD

(71) Applicant: Huawei Technologies Co., Ltd.,
Shenzhen (CN)

(72) Inventor: Jinming Zhang, Wuhan (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 184 days.

(21) Appl. No.: 18/268,068

(22) PCT Filed: Dec. 13, 2021

(86) PCT No.: PCT/CN2021/137527

§ 371 (c)(1),
(2) Date: Jun. 16, 2023

(87) PCT Pub. No.: WO2022/127742

PCT Pub. Date: Jun. 23, 2022

(65) Prior Publication Data

US 2024/0054200 A1 Feb. 15, 2024

(30) Foreign Application Priority Data

Dec. 18, 2020 (CN) .......................... 202011505816.1

(51) Int. Cl.
*G06F 21/32* (2013.01)
*G06F 3/01* (2006.01)
(Continued)
(52) U.S. Cl.
CPC .............. *G06F 21/32* (2013.01); *G06F 3/016*
(2013.01); *G06F 3/16* (2013.01); *G06F 18/20*
(2023.01);
(Continued)

(58) Field of Classification Search
CPC .......... G06F 21/32; G06F 18/20; G06F 3/016;
G06F 3/16; G06F 21/44;
(Continued)

(56) References Cited

U.S. PATENT DOCUMENTS 9,961,547 B1 * 5/2018 Molina-Markham ... H04M 1/67
10,628,569 B2 * 4/2020 Li ............................ G06F 21/32
(Continued)

FOREIGN PATENT DOCUMENTS

CN 102236415 A 11/2011
CN 104318148 A 1/2015
(Continued)

*Primary Examiner* — Oleg Survillo
(74) *Attorney, Agent, or Firm* — Slater Matsil, LLP

(57) ABSTRACT

A device starting system and method. A display device and
an accessory device are provided in the device starting
system. When the display device is in a turn-off state and the
accessory device is in a turn-on state, a user may perform an
operation on the accessory device, and the accessory device
collects to-be-verified fingerprint data in response to the
operation of the user. Then, the to-be-verified fingerprint
data is matched with pre-stored fingerprint data of the user,
to identify whether an identity of the user is valid. If the
to-be-verified fingerprint data successfully matches the fin-
gerprint data of the user, the display device performs a
turn-on operation. Alternatively, if the to-be-verified finger-
print data fails to match the fingerprint data of the user, the
display device may output a first feedback.

20 Claims, 31 Drawing Sheets

(51) Int. Cl.

| | |
|---|---|
| *G06F 3/16* | (2006.01) |
| *G06F 18/20* | (2023.01) |
| *G06F 21/44* | (2013.01) |
| *G06V 40/12* | (2022.01) |
| *G06V 40/50* | (2022.01) |
| *G06V 40/60* | (2022.01) |
| *H04W 4/80* | (2018.01) |

(52) U.S. Cl.
CPC .......... *G06F 21/44* (2013.01); *G06V 40/1365* (2022.01); *G06V 40/50* (2022.01); *G06V 40/67* (2022.01); *H04W 4/80* (2018.02); *G06F 2221/2117* (2013.01)

(58) Field of Classification Search
CPC ............ G06F 2221/2117; G06V 40/67; G06V 40/1365; G06V 40/50; H04W 4/80
See application file for complete search history.

(56) References Cited

U.S. PATENT DOCUMENTS

| | | | | |
|---|---|---|---|---|
| 11,055,683 B1* | 7/2021 | Bartholomew | ...... | G06Q 20/341 |
| 11,416,840 B1* | 8/2022 | Wolfe | .................. | G06Q 20/352 |
| 12,254,877 B2* | 3/2025 | Jung | ...................... | G06F 3/167 |
| 2003/0050900 A1* | 3/2003 | Kuraishi | .......... | G06Q 20/40145 |
| | | | | 705/65 |
| 2005/0231485 A1* | 10/2005 | Jones | ...................... | G06F 21/83 |
| | | | | 345/168 |
| 2007/0196002 A1* | 8/2007 | Choi | ...................... | G06F 1/1601 |
| | | | | 382/124 |
| 2009/0121833 A1* | 5/2009 | Falck | ...................... | G07C 9/257 |
| | | | | 340/5.83 |
| 2010/0235912 A1* | 9/2010 | Hermann | ................ | G06F 21/57 |
| | | | | 710/313 |
| 2013/0215275 A1* | 8/2013 | Berini | .................. | G06V 10/993 |
| | | | | 348/150 |
| 2015/0172363 A1* | 6/2015 | Okada | .................... | H04N 23/65 |
| | | | | 713/300 |
| 2015/0324567 A1* | 11/2015 | Chiang | ................. | H04W 12/33 |
| | | | | 340/5.83 |
| 2017/0286660 A1* | 10/2017 | Li | .......................... | G06V 40/13 |
| 2018/0060928 A1* | 3/2018 | Sadler | .................... | G06Q 20/20 |
| 2018/0348842 A1* | 12/2018 | Biron | .................... | G06F 1/3296 |
| 2019/0223101 A1* | 7/2019 | Li | ...................... | H04W 52/0229 |
| 2020/0296627 A1* | 9/2020 | Arvidson | .......... | H04W 28/0835 |
| 2021/0120555 A1* | 4/2021 | Badic | .................... | H04W 72/12 |
| 2021/0342568 A1* | 11/2021 | Huang | .................... | G06F 3/041 |
| 2022/0198863 A1* | 6/2022 | Ho | ............................ | G07C 9/37 |
| 2022/0303746 A1* | 9/2022 | Liu | ........................ | H04W 84/18 |

FOREIGN PATENT DOCUMENTS

| | | |
|---|---|---|
| CN | 104319148 A | 1/2015 |
| CN | 106548054 A | 3/2017 |
| CN | 106792334 A | 5/2017 |
| CN | 107734177 A | 2/2018 |
| CN | 208477423 U | 2/2019 |
| CN | 112087433 A | 12/2020 |

* cited by examiner 102            101

41

41

File management

Email

Browser

File management

Email

Browser

71

72   721

DEVICE STARTING SYSTEM AND METHOD

CROSS-REFERENCE TO RELATED APPLICATIONS

This application is a national stage of International Application No. PCT/CN2021/137527, filed on Dec. 13, 2021, which claims priority to Chinese Patent Application No. 202011505816.1, filed on Dec. 18, 2020. Both of the aforementioned applications are hereby incorporated by reference in their entireties.

TECHNICAL FIELD

This application belongs to the field of terminal technologies, and in particular, to a device starting system and method.

BACKGROUND

With the development of science and technology, more electronic devices enter people's work and life.

Due to factors such as a manufacturer setting and a user setting, some electronic devices are started in very cumbersome manners. When starting such an electronic device, a user needs to manually perform a large quantity of operations, which is time-consuming and greatly affects user experience.

SUMMARY

Embodiments of this application provide a device starting system and method, to resolve a technical problem that a user currently needs to perform a large quantity of operations to start an electronic device, which is time-consuming and affects user experience.

According to a first aspect, an embodiment of this application provides a device starting system, including a display device and an accessory device.

When the display device is in a turn-off state and the accessory device is in a turn-on state, the accessory device is configured to: collect to-be-verified fingerprint data; match the to-be-verified fingerprint data with prestored fingerprint data of a user; and when the to-be-verified fingerprint data successfully matches the fingerprint data of the user, send a first turn-on instruction to the display device through a Bluetooth connection.

The display device is configured to perform a turn-on operation when receiving the first turn-on instruction.

The accessory device is further configured to: when the to-be-verified fingerprint data fails to match the fingerprint data of the user, output a first feedback, where the first feedback includes one or more of a vibration feedback, a light feedback, and a sound feedback.

It should be noted that the display device is an electronic device having a display. For example, the display device may be an all-in-one machine, a tablet computer, a mobile phone, or another electronic device having a display.

The turn-off state may be a state in which the display device stops supplying power to each module, so that the display device stops normal running, or the turn-off state may be a state in which the display device stops using the display, or the turn-off state may be reflected in another form. A specific form of the turn-off state is not limited in this application.

The accessory device is an auxiliary device that assists a user in operating the display device. For example, the accessory device may be an auxiliary electronic device such as a stylus, a wireless keyboard, or a wireless mouse.

When the display device is in the turn-off state and the accessory device is in the turn-on state (namely, a normal working state), the user may perform an operation on the accessory device, to quickly start the display device.

The accessory device may collect the to-be-verified fingerprint data in response to the operation of the user.

Because fingerprint data of each person is different, the accessory device may match the to-be-verified fingerprint data with the prestored fingerprint data of the user, to identify whether an identity of the user is valid.

If the to-be-verified fingerprint data matches the fingerprint data of the user, it indicates that the identity of the user is valid, and the accessory device may send the first turn-on instruction to the display device through the Bluetooth connection.

When the display device receives the first turn-on instruction, the display device may perform the turn-on operation, to start the display device and enter a normal working state.

If the to-be-verified fingerprint data fails to match the fingerprint data of the user, it indicates that the identity of the user is invalid, and the accessory device may output the first feedback.

The first feedback is used to prompt the user that fingerprint data matching fails. Specifically, the first feedback may include one or more of forms such as the vibration feedback, the light feedback (for example, indicator blinking), and the sound feedback (for example, speaker voice broadcast or buzzer sounding).

For example, when the to-be-verified fingerprint data fails to be matched, the accessory device may continuously vibrate for one second. When the user feels the vibration, the user may learn that fingerprint data matching fails, and re-enroll fingerprint data, or start the display device in another manner.

According to the device starting system provided in this application, the user may enroll the to-be-verified fingerprint data by using the accessory device, to quickly start the display device by using the to-be-verified fingerprint data. This implements a simple, convenient, and fast operation, and implements strong usability and practicability.

In a possible implementation of the first aspect, a Bluetooth module of the display device is provided with a first Bluetooth system and a second Bluetooth system.

When the display device is in the turn-off state, the Bluetooth module of the display device uses the first Bluetooth system, and the first Bluetooth system is configured to receive the first turn-on instruction.

When the display device is in a turn-on state, the Bluetooth module of the display device uses the second Bluetooth system, and the second Bluetooth system is configured to be paired with the accessory device or an electronic device other than the accessory device.

It should be noted that the Bluetooth module of the display device may be provided with two Bluetooth operating systems, namely, the first Bluetooth system and the second Bluetooth system.

The first Bluetooth system may also be referred to as a Bluetooth subsystem. The first Bluetooth system may have simple functions such as identification of the first turn-on instruction and link keepalive.

For example, a turn-on key value filter may be set for the first Bluetooth system, and whether a received packet is the first turn-on instruction is identified by using the turn-on key value filter. In addition, the first Bluetooth system may maintain the Bluetooth connection between the display device and the accessory device by using a self-defined keepalive packet and a self-defined interaction period.

The second Bluetooth system is a Bluetooth operating system when the display device works normally. In the turn-on state, the display device may establish a Bluetooth connection to and be paired with the accessory device or another electronic device by using the second Bluetooth system.

When the display device is in the turn-on state, the display device may use the second Bluetooth system. When the display device is in the turn-off state, a main system of the display device stops running, and the second Bluetooth system also stops running. In this case, the display device may use the first Bluetooth system. The first Bluetooth system is disposed in the Bluetooth module. Running of the first Bluetooth system is not affected by the main system of the display device, and may run independently. Therefore, the display device may implement the simple functions such as identification of the first turn-on instruction and link keepalive by using the first Bluetooth system, to prevent the Bluetooth module from stopping working.

In a possible implementation of the first aspect, the display device is an all-in-one machine.

It should be noted that the display device may be an all-in-one machine. An all-in-one desktop computer means that a host of a conventional split desktop computer is integrated into a display to form an all-in-one desktop computer.

In a possible implementation of the first aspect, the accessory device is a Bluetooth keyboard, the Bluetooth keyboard is provided with a fingerprint collection module, and the fingerprint collection module is configured to collect the to-be-verified fingerprint data.

It should be noted that the accessory device may be a Bluetooth keyboard. The Bluetooth keyboard refers to a wireless keyboard provided with a Bluetooth module. To collect fingerprint data, the Bluetooth keyboard may be provided with the fingerprint collection module. When a finger of the user is placed on a surface of the fingerprint collection module, the fingerprint collection module may collect fingerprint data, for example, the to-be-verified fingerprint data.

In a possible implementation of the first aspect, the display device is specifically configured to: when receiving the first turn-on instruction, control a power module of the display device to supply power to each to-be-started module of the display device.

It should be noted that, in some scenarios, that the display device is in the turn-off state means that the display device stops supplying power to each module, so that the display device stops running.

In this case, that the display device performs the turn-on operation means that the display device controls the power module (for example, a battery or a power interface connected to an external power supply) of the device to perform a power-on operation, and supplies power to each to-be-started module (namely, a module required for normal running of the display device) of the display device, so that the display device enters a normal working state.

For example, when the Bluetooth module of the display device receives the first turn-on instruction, the Bluetooth module transfers a trigger signal to the power module through a general-purpose input/output (General-purpose input/output, GPIO) interface.

When receiving the trigger signal, the power module performs the power-on operation to supply power to each to-be-started module of the display device, to start the display device.

In a possible implementation of the first aspect, the display device is specifically configured to turn on a display of the display device when receiving the first turn-on instruction.

It should be noted that, in some other scenarios, that the display device is in the turn-off state may alternatively be understood as a state in which the display of the display device is not turned on. For example, in a scenario, the display of the display device may sleep because the display device is not used for a long time, or the display of the display device is actively turned off.

In this case, that the display device performs the turn-on operation may be understood as that the display device turns on the display, so that the user can normally use the display device.

According to a second aspect, an embodiment of this application provides a device starting system, including a display device and an accessory device.

When the display device is in a turn-off state and the accessory device is in a turn-on state, the accessory device is configured to collect to-be-verified fingerprint data, and send the to-be-verified fingerprint data to the display device through a Bluetooth connection.

The display device is configured to: when receiving the to-be-verified fingerprint data, match the to-be-verified fingerprint data with prestored fingerprint data of a user; and when the to-be-verified fingerprint data successfully matches the fingerprint data of the user, perform a turn-on operation.

The display device is further configured to: when the to-be-verified fingerprint data fails to match the fingerprint data of user, output a second feedback, where the second feedback includes one or more of a vibration feedback, a light feedback, and a sound feedback.

It should be noted that the to-be-verified fingerprint data may alternatively be verified on the display device. In this case, the accessory device is responsible for collecting the to-be-verified fingerprint data and transmitting the to-be-verified fingerprint data, and does not perform fingerprint data verification.

After receiving the to-be-verified fingerprint data, the display device matches the to-be-verified fingerprint data with the locally prestored fingerprint data of the user, to identify whether an identity of the user is valid.

If the to-be-verified fingerprint data matches the fingerprint data of the user, it indicates that the identity of the user is valid, and the display device may perform the turn-on operation, to start the display device and enter a normal working state.

If the to-be-verified fingerprint data fails to match the fingerprint data of the user, it indicates that the identity of the user is invalid, and the display device may output the second feedback.

The second feedback includes one or more of the vibration feedback, the light feedback, and the sound feedback.

The second feedback is used to prompt the user that fingerprint data matching fails. Specifically, the second feedback may include one or more of forms such as the vibration feedback, the light feedback (for example, indicator blinking), and the sound feedback (for example, speaker voice broadcast or buzzer sounding).

For example, when the to-be-verified fingerprint data fails to be matched, the display device may continuously vibrate for one second. When the user feels the vibration, the user may learn that fingerprint data matching fails, and re-enroll fingerprint data, or start the display device in another manner.

Alternatively, in some other possible implementations, the display device may feed back verification failure information to the accessory device.

After receiving the verification failure information, the accessory device outputs a third feedback. The third feedback includes one or more of the vibration feedback, the light feedback, and the sound feedback.

In addition, because the fingerprint data is important privacy information, before transferring the fingerprint data, the accessory device may perform a confidential operation on the fingerprint data.

A confidential operation manner may be set based on an actual requirement. For example, in some embodiments, before transmitting the fingerprint data, the accessory device may encrypt the fingerprint data based on an encryption manner pre-agreed with the display device, and transmit the fingerprint data in a form of fingerprint encrypted data. Alternatively, in some other embodiments, the accessory device may create an upper-layer secure transmission channel (for example, a transport layer security (Transport Layer Security, TLS) channel) to the display device based on a wireless connection, and transmit the fingerprint data through the secure transmission channel. Alternatively, in some other embodiments, the foregoing two manners may be combined. The accessory device may first encrypt the fingerprint data, and then transmit fingerprint encrypted data through a secure transmission channel. Alternatively, the accessory device may perform another confidential operation. A specific implementation of the confidential operation is not limited in this embodiment of this application.

In a possible implementation of the second aspect, a Bluetooth module of the display device is provided with a first Bluetooth system and a second Bluetooth system.

When the display device is in the turn-off state, the Bluetooth module of the display device uses the first Bluetooth system, and the first Bluetooth system is configured to receive the to-be-verified fingerprint data.

When the display device is in a turn-on state, the Bluetooth module of the display device uses the second Bluetooth system, and the second Bluetooth system is configured to be paired with the accessory device or an electronic device other than the accessory device.

In a possible implementation of the second aspect, the display device is an all-in-one machine.

In a possible implementation of the second aspect, the accessory device is a Bluetooth keyboard, the Bluetooth keyboard is provided with a fingerprint collection module, and the fingerprint collection module is configured to collect the to-be-verified fingerprint data.

In a possible implementation of the second aspect, the display device is specifically configured to: when the to-be-verified fingerprint data successfully matches the fingerprint data of the user, control a power module of the display device to supply power to each to-be-started module of the display device.

It should be noted that, when receiving the to-be-verified fingerprint data, the display device may perform verification on the to-be-verified fingerprint data by using a fingerprint processing module, and then the display device controls, based on a verification result, the power module of the display device to supply power to each to-be-started module of the display device.

For example, when the Bluetooth module of the display device receives the to-be-verified fingerprint data, the Bluetooth module may transfer the to-be-verified fingerprint data to the fingerprint processing module.

The fingerprint processing module verifies the to-be-verified fingerprint data, and matches the to-be-verified fingerprint data with the prestored fingerprint data of the user.

If verification of the to-be-verified fingerprint data succeeds, the fingerprint processing module feeds back a second turn-on instruction to the Bluetooth module.

When the Bluetooth module receives the second turn-on instruction, the Bluetooth module transfers a trigger signal to the power module through a general-purpose input/output (General-purpose input/output, GPIO) interface.

When receiving the trigger signal, the power module performs the power-on operation to supply power to each to-be-started module of the display device, to start the display device.

In a possible implementation of the second aspect, the display device is specifically configured to: when the to-be-verified fingerprint data successfully matches the fingerprint data of the user, turn on a display of the display device.

According to a third aspect, an embodiment of this application provides a device starting method, including:

An accessory device collects to-be-verified fingerprint data, and matches the to-be-verified fingerprint data with prestored fingerprint data of a user.

When the to-be-verified fingerprint data successfully matches the fingerprint data of the user, the accessory device sends a first turn-on instruction to a display device through a Bluetooth connection.

The display device performs a turn-on operation when the display device receives the first turn-on instruction.

When the to-be-verified fingerprint data fails to match the fingerprint data of the user, the accessory device outputs a first feedback, where the first feedback includes one or more of a vibration feedback, a light feedback, and a sound feedback.

In a possible implementation of the third aspect, after the display device performs the turn-on operation, the method further includes:

The display device switches a Bluetooth module of the display device from a first Bluetooth system to a second Bluetooth system, where the first Bluetooth system is configured to receive the first turn-on instruction, and the second Bluetooth system is configured to be paired with the accessory device or an electronic device other than the accessory device.

In a possible implementation of the third aspect, the display device is an all-in-one machine.

In a possible implementation of the third aspect, the accessory device is a Bluetooth keyboard, the Bluetooth keyboard is provided with a fingerprint collection module, and the fingerprint collection module is configured to collect the to-be-verified fingerprint data.

In a possible implementation of the third aspect, that the display device performs a turn-on operation includes:

The display device controls a power module of the display device to supply power to each to-be-started module of the display device.

In a possible implementation of the third aspect, that the display device performs a turn-on operation includes:

The display device turns on a display of the display device.

According to a fourth aspect, an embodiment of this application provides a device starting method, including:

An accessory device collects to-be-verified fingerprint data, and sends the to-be-verified fingerprint data to a display device through a Bluetooth connection.

When the display device receives the to-be-verified fingerprint data, the display device matches the to-be-verified fingerprint data with prestored fingerprint data of a user.

When the to-be-verified fingerprint data successfully matches the fingerprint data of the user, the display device performs a turn-on operation.

When the to-be-verified fingerprint data fails to match the fingerprint data of the user, the display device outputs a second feedback, where the second feedback includes one or more of a vibration feedback, a light feedback, and a sound feedback.

In a possible implementation of the fourth aspect, after the display device performs the turn-on operation, the method further includes:

The display device switches a Bluetooth module of the display device from a first Bluetooth system to a second Bluetooth system, where the first Bluetooth system is configured to receive the first turn-on instruction, and the second Bluetooth system is configured to be paired with the accessory device or an electronic device other than the accessory device.

In a possible implementation of the fourth aspect, the display device is an all-in-one machine.

In a possible implementation of the fourth aspect, the accessory device is a Bluetooth keyboard, the Bluetooth keyboard is provided with a fingerprint collection module, and the fingerprint collection module is configured to collect the to-be-verified fingerprint data.

In a possible implementation of the fourth aspect, that the display device performs a turn-on operation includes:

The display device controls a power module of the display device to supply power to each to-be-started module of the display device.

In a possible implementation of the fourth aspect, that the display device performs a turn-on operation includes:

The display device turns on a display of the display device.

Compared with the conventional technology, embodiments of this application have the following beneficial effect.

A display device and an accessory device are provided in a device starting system of this application. When the display device is in a turn-off state and the accessory device is in a turn-on state, a user may perform an operation on the accessory device, and the accessory device collects to-be-verified fingerprint data in response to the operation of the user. Then, the to-be-verified fingerprint data is matched with prestored fingerprint data of the user, to identify whether an identity of the user is valid. If the to-be-verified fingerprint data successfully matches the fingerprint data of the user, the display device performs a turn-on operation. Alternatively, if the to-be-verified fingerprint data fails to match the fingerprint data of the user, the display device may output a first feedback.

According to the device starting system provided in this application, the user may enroll the to-be-verified fingerprint data by using the accessory device, to quickly start the display device by using the to-be-verified fingerprint data. In an entire device starting process, the user only needs to enroll the to-be-verified fingerprint data, and does not need to perform another operation, which is simple, convenient, and fast. This resolves a technical problem that it is time-consuming because the user currently needs to perform a large quantity of operations to start an electronic device, and implements strong usability and practicability.

DETAILED DESCRIPTION OF ILLUSTRATIVE EMBODIMENTS

Figure 1:
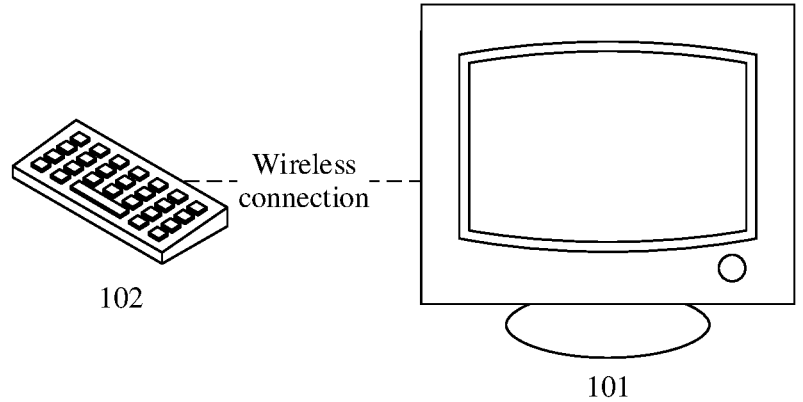
FIG. 1 is a schematic diagram of a device starting system according to an embodiment of this application.

In the following descriptions, for illustration instead of limitation, specific details such as a particular system structure and a technology are provided to make a thorough understanding of embodiments of this application. However, a person skilled in the art should know that this application may be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized.

A device starting method provided in embodiments of this application may be applied to an electronic device such as an all-in-one machine, a tablet computer, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

With the development of science and technology, more electronic devices enter people's work and life.

Due to factors such as a manufacturer setting and a user setting, starting manners of some electronic devices are particularly complex.

For example, when starting a desktop computer, a user may need to press a turn-on button first, and then wait for the desktop computer to display a user login interface. After the desktop computer displays the user login interface, the user needs to select a login system account and enter a corresponding password to access a corresponding home page of the account.

When using such an electronic device, a user needs to perform a large quantity of operations, which is time-consuming and greatly affects user experience.

In view of this, embodiments of this application provide a device starting method, an electronic device, and a computer-readable storage medium. According to the device starting method provided in embodiments, the electronic device can be easily and conveniently started. This resolves a technical problem that it is time-consuming because the user currently needs to perform a large quantity of operations to start the electronic device, and implements strong usability and practicability.

First, a device starting system shown in FIG. 1 is used as an example. The device starting system is a system to which the device starting method provided in embodiments of this application is applicable.

As shown in FIG. 1, the device starting system includes an electronic device 101 (namely, the foregoing display device) and an accessory device 102.

Figure 2:
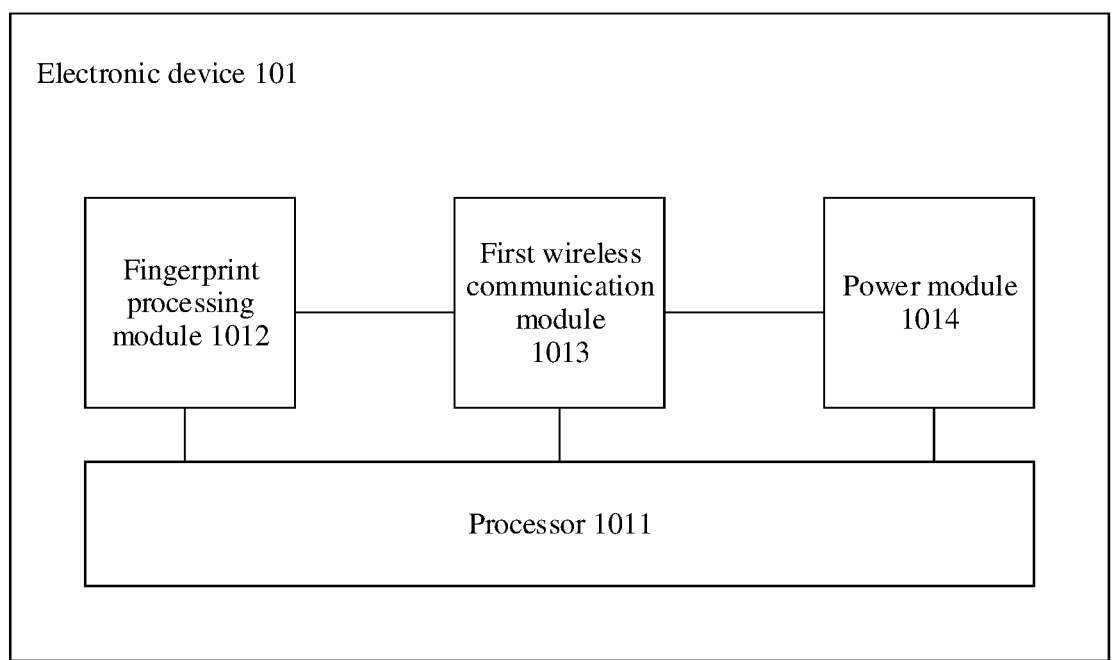
FIG. 2 is a schematic diagram of a structure of an electronic device according to an embodiment of this application.

As shown in FIG. 2, the electronic device 101 may include a processor 1011, a fingerprint processing module 1012, a first wireless communication module 1013, and a power module 1014.

The accessory device 102 is an auxiliary device configured to assist a user in operating the electronic device 101. For example, the accessory device 102 may be an auxiliary electronic device such as a stylus, a wireless keyboard, a wireless mouse, or a remote control.

Figure 3:
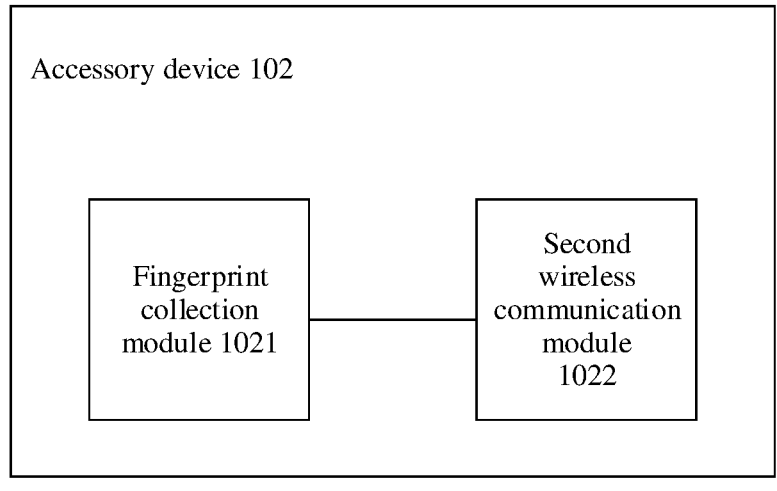
FIG. 3 is a schematic diagram of a structure of an accessory device according to an embodiment of this application.

As shown in FIG. 3, the accessory device 102 may include a fingerprint collection module 1021 and a second wireless communication module 1022.

The fingerprint collection module 1021 may be configured to collect fingerprint data of the user, perform verification on the fingerprint data of the user, and determine, based on a verification result of the fingerprint data, whether to send a first turn-on instruction to the second wireless communication module 1022.

The first wireless communication module 1013 and the second wireless communication module 1022 are configured to establish a wireless connection. The first wireless communication module 1013 and the second wireless communication module 1022 may include any one or any combination of a plurality of wireless communication modules such as a Bluetooth (Bluetooth, BT) module, a wireless fidelity (wireless fidelity, Wi-Fi) module, a near field communication (Near Field Communication, NFC) module, a radio frequency identification (Radio Frequency Identification, RFID) module, and a Zigbee (Zigbee) module.

In addition, the first wireless communication module 1013 and the second wireless communication module 1022 need to include at least one same wireless communication module, to establish a corresponding wireless connection.

For example, it is assumed that the first wireless communication module 1013 may include a Bluetooth module and a Wi-Fi module, and the second wireless communication module 1022 includes a Bluetooth module. In this case, the first wireless communication module 1013 and the second wireless communication module 1022 each include the Bluetooth module. The electronic device 101 may establish a Bluetooth connection to the second wireless communication module 1022 of the accessory device 102 through the first wireless communication module 1013, and perform data exchange through the Bluetooth connection.

When receiving information transferred by the fingerprint collection module 1021, the second wireless communication module 1022 may transfer, to the first wireless communication module 1013 through the wireless connection, the information transferred by the fingerprint collection module 1021. The information may be the first turn-on instruction or to-be-verified fingerprint data.

The first wireless communication module 1013 receives, through the wireless connection, the information transferred by the second wireless communication module 1022. If the information is the to-be-verified fingerprint data, the first wireless communication module 1013 may transfer the to-be-verified fingerprint data to the fingerprint processing module 1012 for processing.

The fingerprint processing module 1012 may perform verification on the to-be-verified fingerprint data transferred by the first wireless communication module 1013, and determine, based on a verification result of the fingerprint data, whether to send a second turn-on instruction to the first wireless communication module 1013.

A type of the fingerprint processing module 1012 may be set based on an actual situation. For example, the fingerprint processing module 1012 may be a module having a data processing function, such as a microcontroller unit (Microcontroller Unit, MCU) or a digital signal processor (digital signal processor, DSP).

When receiving the first turn-on instruction or the second turn-on instruction, the first wireless communication module 1013 may send a trigger signal to the power module 1014 in response to the turn-on instruction.

When receiving the trigger signal sent by the first wireless communication module 1013, the power module 1014 performs a power-on operation to supply power to each module (for example, the processor 1011) of the electronic device 101, to start the electronic device.

It may be understood that the structures shown in this embodiment of this application do not constitute a specific limitation on the electronic device 101 and the accessory device 102. In some other embodiments of this application, the electronic device 101 and the accessory device 102 may include more or fewer components than those shown in the figure, or some components may be combined, or some components may be split, or different component arrangements may be used. In addition, the components shown in the figure may be implemented by hardware, software, or a combination of software and hardware.

With reference to the device starting system shown in FIG. 1 to FIG. 3 and with reference to specific application scenarios, the following describes in detail the device starting method provided in embodiments of this application.

1. Pairing Between an Electronic Device and an Accessory Device.

The pairing between the electronic device and the accessory device means that the electronic device and the accessory device set each other as a default data transmission object.

For example, it is assumed that the accessory device is a Bluetooth keyboard, and the electronic device includes a desktop computer and a tablet computer. After the Bluetooth keyboard establishes a Bluetooth connection to the desktop computer and is paired with the desktop computer, the Bluetooth keyboard determines the desktop computer as a default data transmission object. When the Bluetooth keyboard detects an operation of a user, the Bluetooth keyboard transfers operation data to the desktop computer, but does not transfer the operation data to the tablet computer.

In a process of first pairing between the electronic device and the accessory device, the accessory device may control, in response to a first pairing operation of the user, a wireless communication module of the accessory device to enter a searchable mode.

The electronic device may control, in response to a second pairing operation of the user, a wireless communication module of the electronic device to search for a surrounding connectable electronic device (a connectable device for short below).

Then, the electronic device may be directly paired with the connectable device. Alternatively, the electronic device may display a search list to the user, and the search list is a list of connectable devices found by the electronic device. Then, in response to a selection operation performed by the user on the search list, the electronic device establishes a wireless connection to and is paired with a connectable device selected by the user.

The first pairing operation, the second pairing operation, and the selection operation may be set based on an actual application scenario and an actual device type. For example, when a touchscreen is provided on the electronic device, the first pairing operation may include any one or any combination of a plurality of gesture operations such as tapping, sliding, and touching and holding.

After the electronic device is paired with the accessory device for the first time, if a wireless communication function is enabled on both the electronic device and the accessory device, and the electronic device and the accessory device are in an appropriate connection range, the electronic device may automatically establish a wireless connection to and be paired the accessory device.

For ease of understanding, the following describes the pairing process in detail with reference to specific application scenarios.

Figure 4:
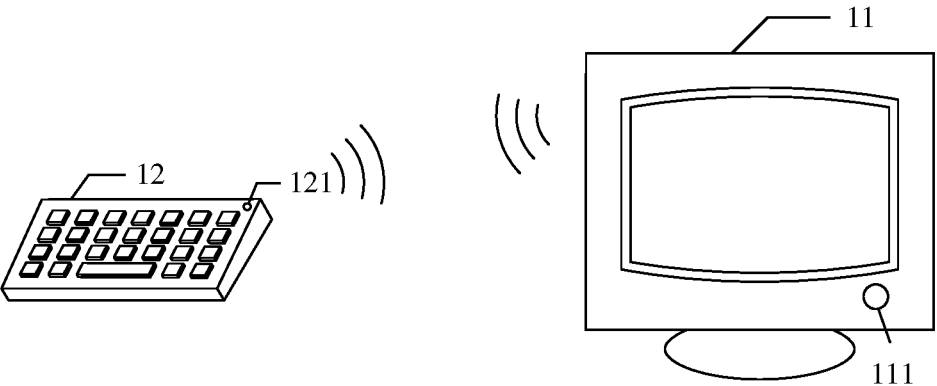
FIG. 4 is a schematic scenario diagram of a device pairing scenario according to an embodiment of this application.

Application Scenario 1:

Refer to FIG. 4. It is assumed that the electronic device is an all-in-one machine 11, and the accessory device is a Bluetooth keyboard 12.

The all-in-one machine 11 may be understood as an all-in-one desktop computer. The all-in-one desktop computer means that a host of a conventional split desktop computer is integrated into a display to form an all-in-one desktop computer.

A first wireless communication module of the all-in-one machine 11 and a second wireless communication module of the Bluetooth keyboard 12 each are provided with a Bluetooth module.

A button 111 is provided on a housing of the all-in-one machine 11. The button 111 may perform a turn-on function, a turn-off function, or another function in response to a press operation of the user.

A fingerprint collection module of the Bluetooth keyboard 12 includes a fingerprint sensor 121. The fingerprint sensor 121 may be configured to detect a touch operation of the user and collect fingerprint data.

Figure 5:
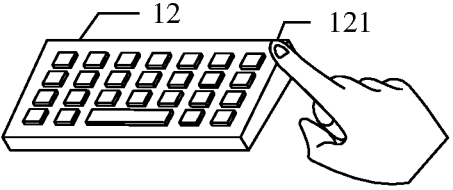
FIG. 5 is a schematic scenario diagram of another device pairing scenario according to an embodiment of this application.

As shown in FIG. 5, when the Bluetooth keyboard 12 detects that the user touches the fingerprint sensor 121, the Bluetooth keyboard 12 may record touch duration.

When the touch duration meets a preset trigger condition, the Bluetooth keyboard 12 may control the Bluetooth module of the device to enter a searchable mode (which is also referred to as a secondary device mode).

In the secondary device mode, the Bluetooth module of the Bluetooth keyboard 12 may be found by a Bluetooth module of another electronic device.

Figure 6:
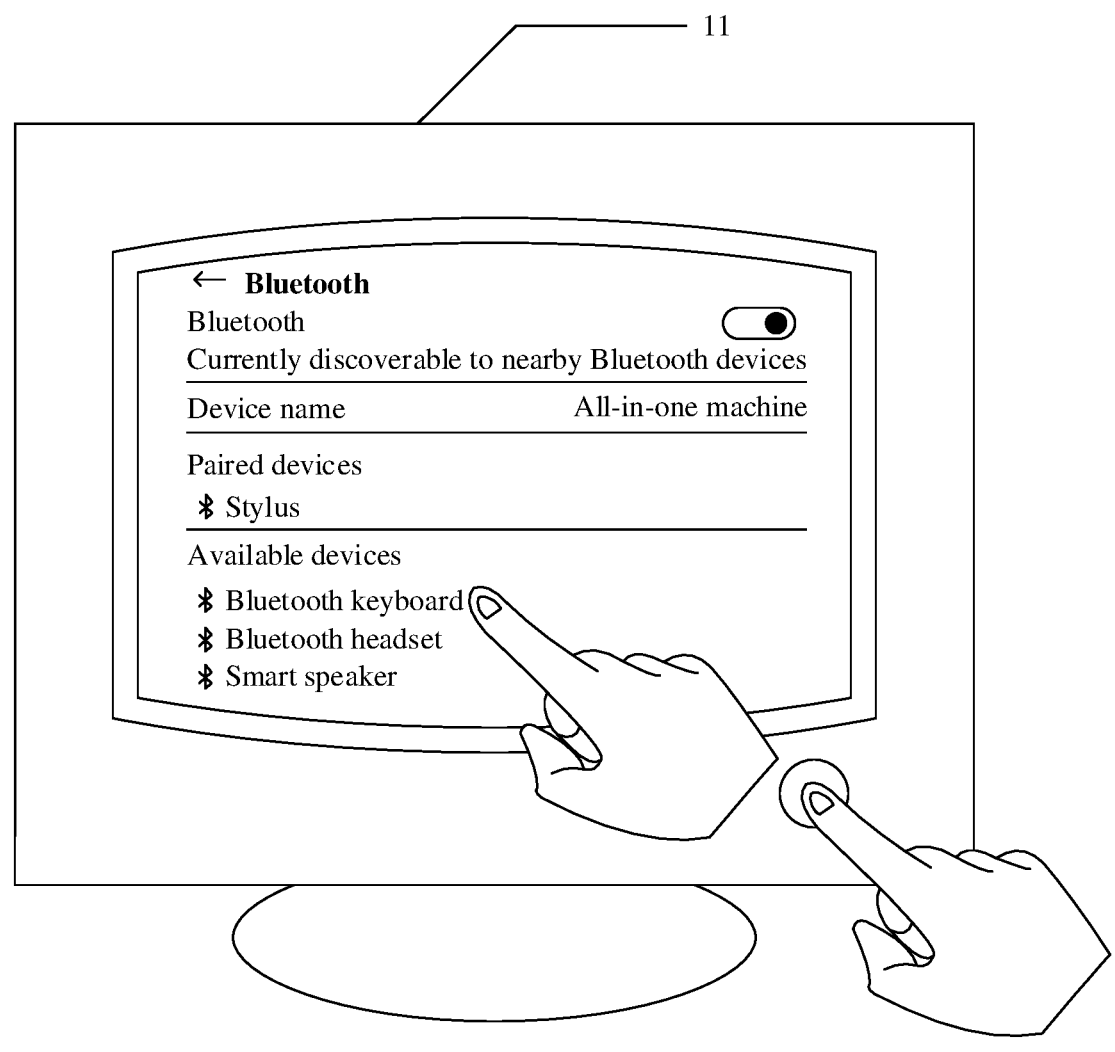
FIG. 6 is a schematic scenario diagram of another device pairing scenario according to an embodiment of this application.

As shown in FIG. 6, the all-in-one machine 11 may control, in response to a touch and hold operation performed by the user on the button 111, the Bluetooth module of the device to search for a surrounding connectable electronic device, and display a search list on a search page.

It is assumed that the search list includes three options: "Bluetooth keyboard", "Bluetooth headset", and "Smart speaker". After the all-in-one machine 11 displays the search list, the all-in-one machine 11 may establish, by using the Bluetooth module of the device, a Bluetooth connection to the Bluetooth module of the Bluetooth keyboard 12 in response to a tap operation performed by the user on the "Bluetooth keyboard" option.

After the Bluetooth keyboard 12 establishes the Bluetooth connection to the all-in-one machine 11, the all-in-one machine 11 sets the Bluetooth keyboard 12 as a pairing object, and the Bluetooth keyboard 12 also sets the all-in-one machine 11 as a pairing object, to complete first pairing with the all-in-one machine 11.

After the all-in-one machine 11 is paired with the Bluetooth keyboard 12 for the first time, if the all-in-one machine 11 and the Bluetooth keyboard 12 both enable Bluetooth functions, and the all-in-one machine 11 and the Bluetooth keyboard 12 are in an appropriate connection range, the all-in-one machine 11 may automatically establish the Bluetooth connection to and be paired with the Bluetooth keyboard 12.

Figure 7:
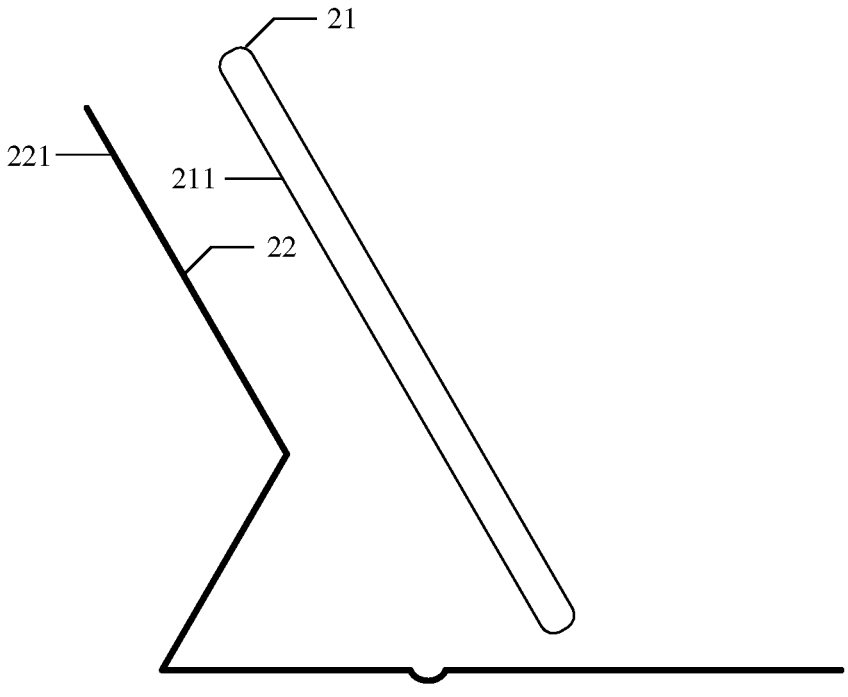
FIG. 7 is a schematic scenario diagram of another device pairing scenario according to an embodiment of this application.

Application Scenario 2:

As shown in FIG. 7, in this application scenario, it is assumed that the electronic device is a tablet computer 21, and the accessory device is a Bluetooth keyboard 22.

A first wireless communication module of the tablet computer 21 and a second wireless communication module of the Bluetooth keyboard 22 each are provided with a Bluetooth module.

A magnetic suction structure 211 (for example, a Hall sensor) is provided on one side of the tablet computer 21, and a magnetic suction structure 221 is provided on the Bluetooth keyboard 22.

Figure 8:
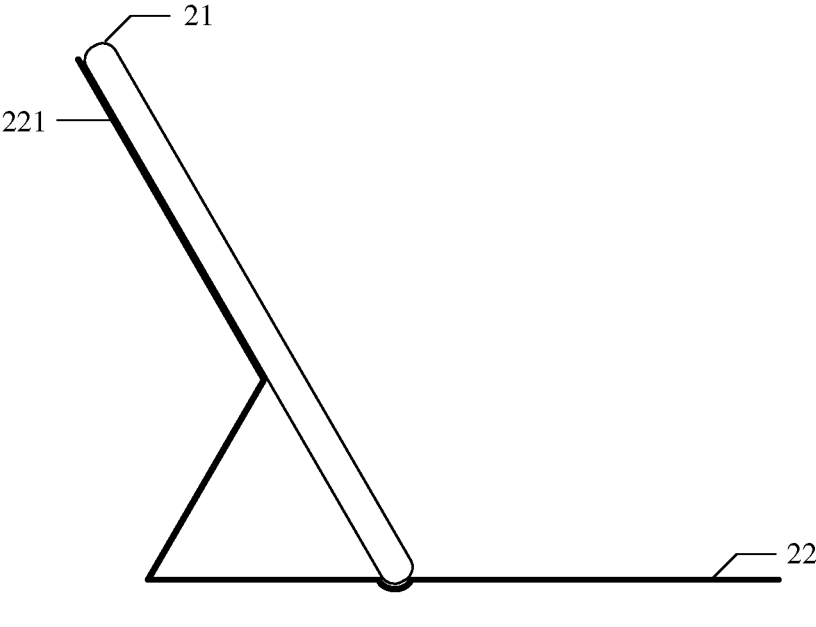
FIG. 8 is a schematic scenario diagram of another device pairing scenario according to an embodiment of this application.

As shown in FIG. 8, when the user attaches and connects the magnetic suction structure 211 of the tablet computer 21 to the magnetic suction structure 221 of the Bluetooth keyboard 22, the tablet computer 21 and the Bluetooth keyboard 22 may automatically trigger an operation of pairing between the tablet computer 21 and the Bluetooth keyboard 22 in response to an operation of the user.

In this case, the Bluetooth keyboard 22 may enter a secondary device mode, and the tablet computer 21 may search for a surrounding connectable device, and automatically establish a Bluetooth connection to the Bluetooth keyboard 22.

After the Bluetooth keyboard 22 establishes the Bluetooth connection to the tablet computer 21, the tablet computer 21 sets the Bluetooth keyboard 22 as a pairing object, the Bluetooth keyboard 22 also sets the tablet computer 21 as a pairing object, and the Bluetooth keyboard 22 completes first pairing with the tablet computer 21.

Figure 9:
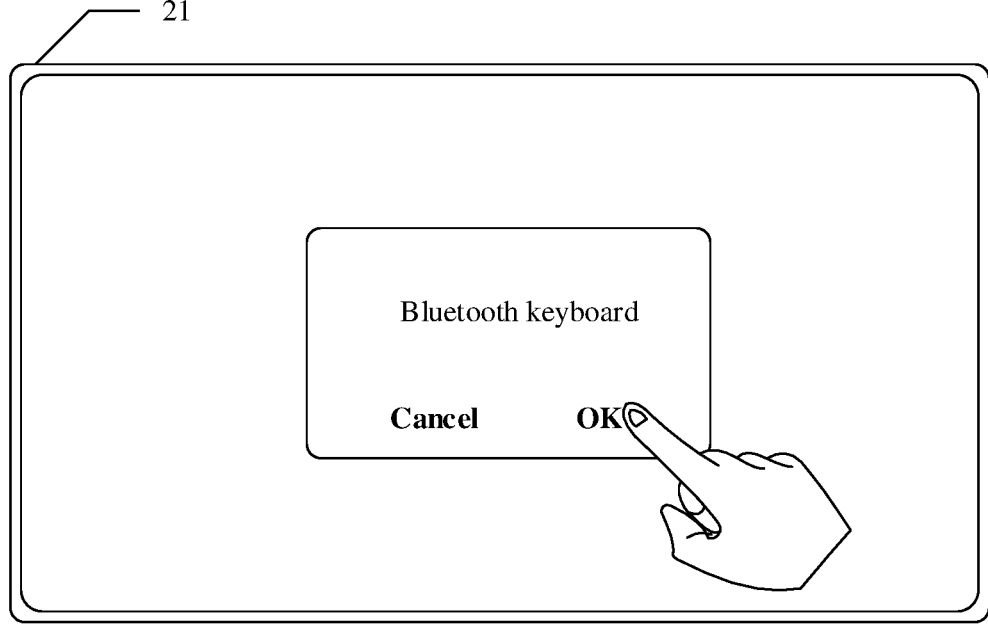
FIG. 9 is a schematic scenario diagram of another device pairing scenario according to an embodiment of this application.

Alternatively, as shown in FIG. 9, after finding the Bluetooth keyboard 22, the tablet computer 21 may display a connection query box on a screen. The connection query box is used to query the user whether to establish a connection to the Bluetooth keyboard 22. On the connection query box, two options are provided: "OK" and "Cancel".

Then, the tablet computer 21 may establish a Bluetooth connection to the Bluetooth keyboard 22 in response to a tap operation performed by the user on the "OK" option.

After the Bluetooth keyboard 22 establishes the Bluetooth connection to the tablet computer 21, the tablet computer 21 sets the Bluetooth keyboard 22 as a pairing object, the Bluetooth keyboard 22 also sets the tablet computer 21 as a pairing object, and the Bluetooth keyboard 22 completes first pairing with the tablet computer 21.

After the tablet computer 21 is paired with the Bluetooth keyboard 22 for the first time, if the tablet computer 21 and the Bluetooth keyboard 22 both enable Bluetooth functions, and the tablet computer 21 and the Bluetooth keyboard 22 are in an appropriate connection range, the tablet computer 21 may automatically establish the Bluetooth connection to and be paired with the Bluetooth keyboard 22.

2. Fingerprint Data Storage

After the electronic device is paired with the accessory device, if fingerprint data of the user is not enrolled on the electronic device or the accessory device, the electronic device and the accessory device may perform a fingerprint enrollment operation, to collect and store the fingerprint data of the user.

In some embodiments, the fingerprint data of the user may be stored in the accessory device. In this case, the accessory device may collect the fingerprint data of the user in response to an operation performed by the user on a fingerprint collection module.

When the fingerprint collection module of the accessory device collects the fingerprint data of the user, the accessory device may directly store the fingerprint data of the user, or the accessory device may perform quality detection on the fingerprint data.

When the accessory device performs quality detection on the fingerprint data, if quality of the fingerprint data is poor (for example, the fingerprint data has defects such as fingerprint incompleteness or a fingerprint blur), and the quality detection fails, the accessory device and/or the electronic device may perform a re-enrollment prompt operation, to prompt the user to re-enroll fingerprint data.

If the quality detection performed on the fingerprint data succeeds, the accessory device stores the fingerprint data (namely, the fingerprint data of the user) for subsequent fingerprint verification.

A form of the re-enrollment prompt operation may be set based on an actual requirement. For example, the re-enrollment prompt operation may be any one or any combination of a plurality of prompt manners such as a text prompt, voice broadcast, and light blinking. The form of the re-enrollment prompt operation is not limited in this embodiment.

Figure 10:
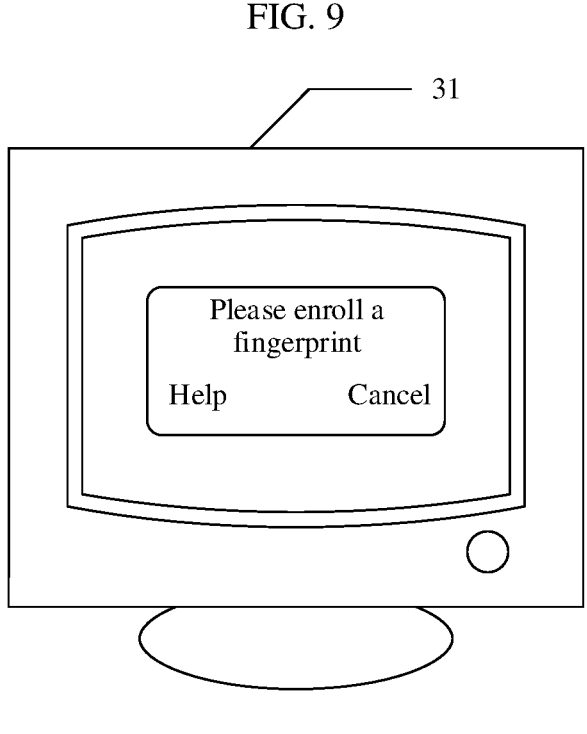
FIG. 10 is a schematic scenario diagram of a fingerprint enrollment scenario according to an embodiment of this application.
Figure 11:
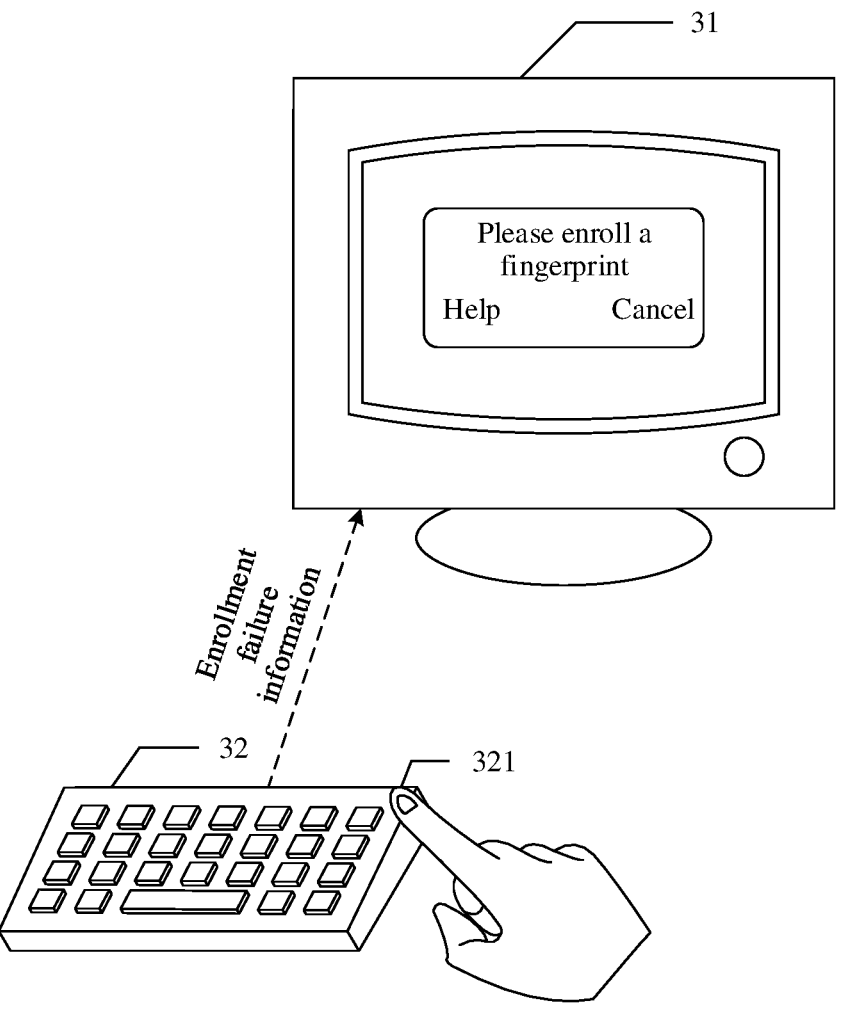
FIG. 11 is a schematic scenario diagram of another fingerprint enrollment scenario according to an embodiment of this application.

Application Scenario 3:

As shown in FIG. 10 and FIG. 11, it is assumed that the electronic device is an all-in-one machine 31, and the accessory device is a Bluetooth keyboard 32. The all-in-one machine 31 and the Bluetooth keyboard 32 each are provided with a Bluetooth module, and a Bluetooth connection is established by using the Bluetooth modules.

After the Bluetooth connection is established, the all-in-one machine 31 detects that no fingerprint data of the user is stored on the Bluetooth keyboard 32. In this case, the all-in-one machine 31 may display a fingerprint enrollment prompt box on a display, and the fingerprint enrollment prompt box is used to prompt the user to enroll a prompt fingerprint.

As shown in FIG. 11, it is assumed that after viewing the fingerprint enrollment prompt box, the user touches a fingerprint sensor 321 of a fingerprint collection module of the Bluetooth keyboard 32 by using a finger.

In this case, in response to the touch operation performed by the user on the fingerprint sensor 321, the Bluetooth keyboard 32 may collect fingerprint data of the user by using the fingerprint sensor 321, and perform quality detection on the collected fingerprint data.

It is assumed that quality of the fingerprint data collected this time is poor, and the quality detection fails. In this case, the Bluetooth keyboard sends enrollment failure information to the all-in-one machine 31.

Figure 12:
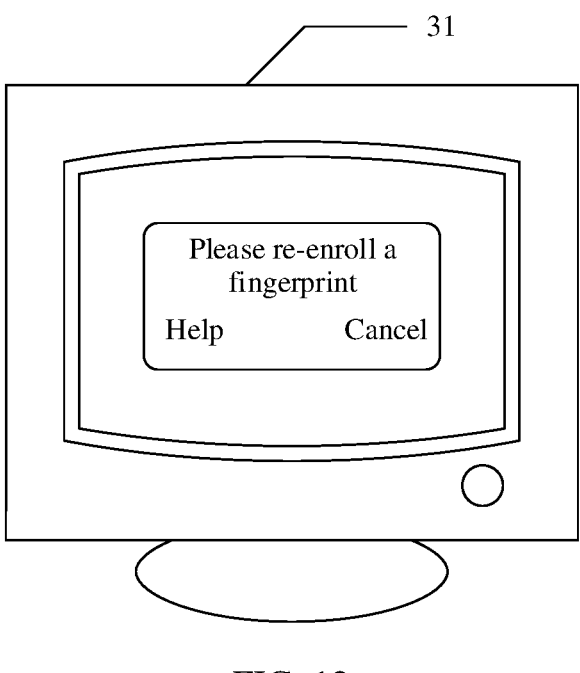
FIG. 12 is a schematic scenario diagram of another fingerprint enrollment scenario according to an embodiment of this application.

As shown in FIG. 12, after receiving the enrollment failure information, the all-in-one machine 31 displays a re-enrollment prompt box on the display, and the re-enrollment prompt box is used to prompt the user to re-enroll fingerprint data.

Figure 13:
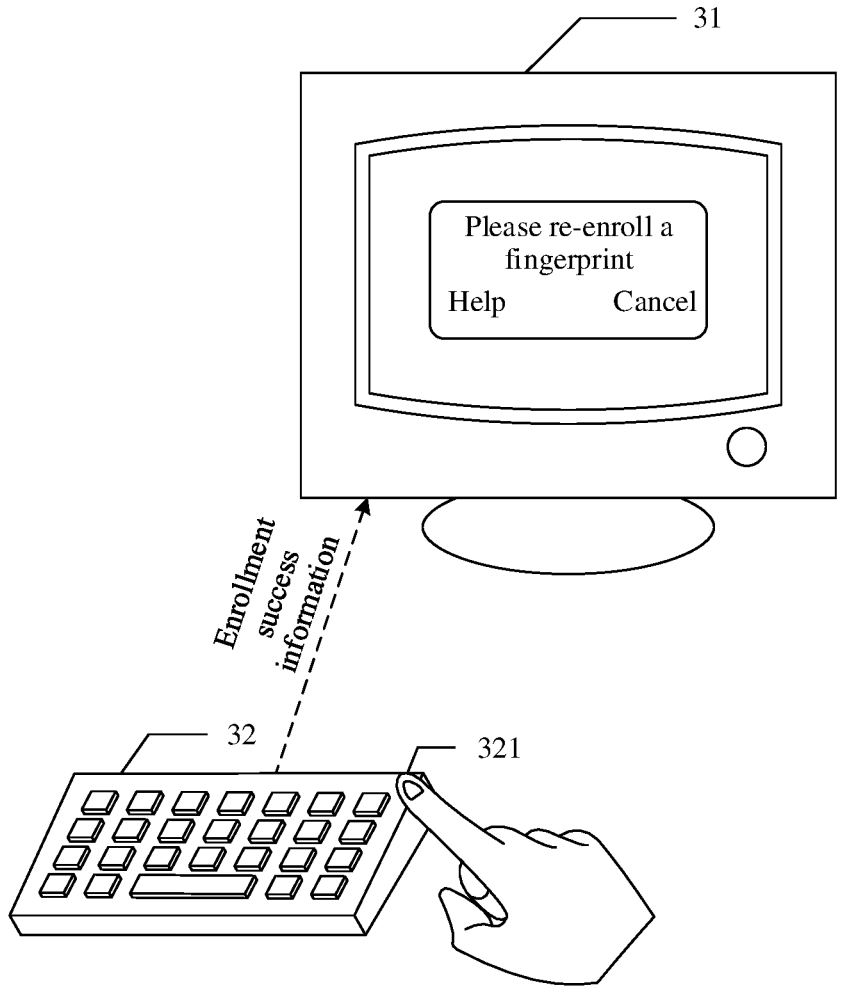
FIG. 13 is a schematic scenario diagram of another fingerprint enrollment scenario according to an embodiment of this application.

As shown in FIG. 13, after viewing re-enrollment prompt information in the re-enrollment prompt box, the user touches the fingerprint sensor 321 again by using the finger.

In this case, in response to the touch operation performed by the user on the fingerprint sensor 321, the Bluetooth keyboard 32 may re-collect the fingerprint data of the user, and perform quality detection on the re-collected fingerprint data.

It is assumed that quality detection performed on the fingerprint data collected this time succeeds. In this case, the Bluetooth keyboard stores the fingerprint data collected this time, and sends enrollment success information to the all-in-one machine 31.

Figure 14:
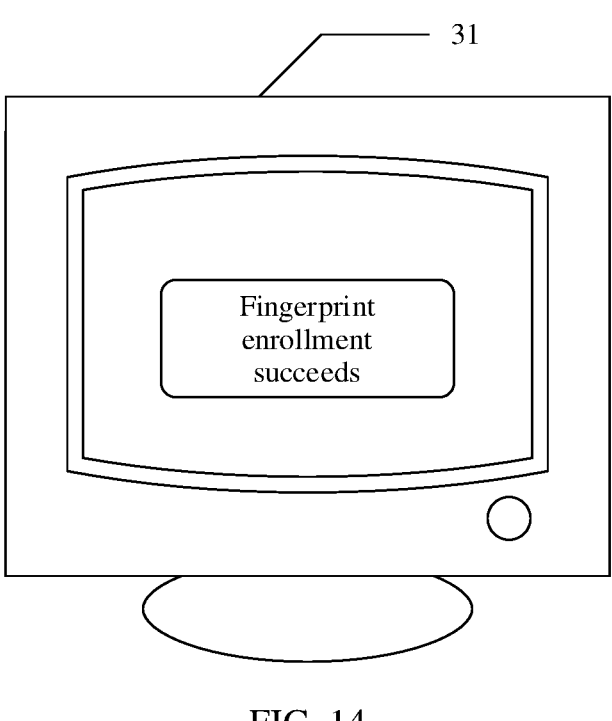
FIG. 14 is a schematic scenario diagram of another fingerprint enrollment scenario according to an embodiment of this application.

As shown in FIG. 14, after receiving the enrollment success information, the all-in-one machine 31 displays "Fingerprint enrollment succeeds" on the display, to prompt the user that the fingerprint data is successfully enrolled, and the fingerprint enrollment operation is completed.

In some other embodiments, the fingerprint data of the user may be stored on the electronic device. In this case, the accessory device may collect the fingerprint data of the user in response to an operation performed by the user on a fingerprint collection module, and transfer the fingerprint data of the user to a second wireless communication module, so that the second wireless communication module sends the fingerprint data of the user to a first wireless communication module.

When the first wireless communication module of the electronic device receives the fingerprint data of the user, the electronic device may directly store the fingerprint data of the user, or the electronic device may perform quality detection on the fingerprint data.

When the electronic device performs quality detection on the fingerprint data, if quality of the fingerprint data is poor (for example, the fingerprint data has defects such as fingerprint incompleteness or a fingerprint blur), and the quality detection fails, the accessory device and/or the electronic device may perform a re-enrollment prompt operation, to prompt the user to re-enroll a fingerprint.

If the quality detection performed on the fingerprint data succeeds, the electronic device may store the fingerprint data of the user for subsequent fingerprint verification.

Figure 15:
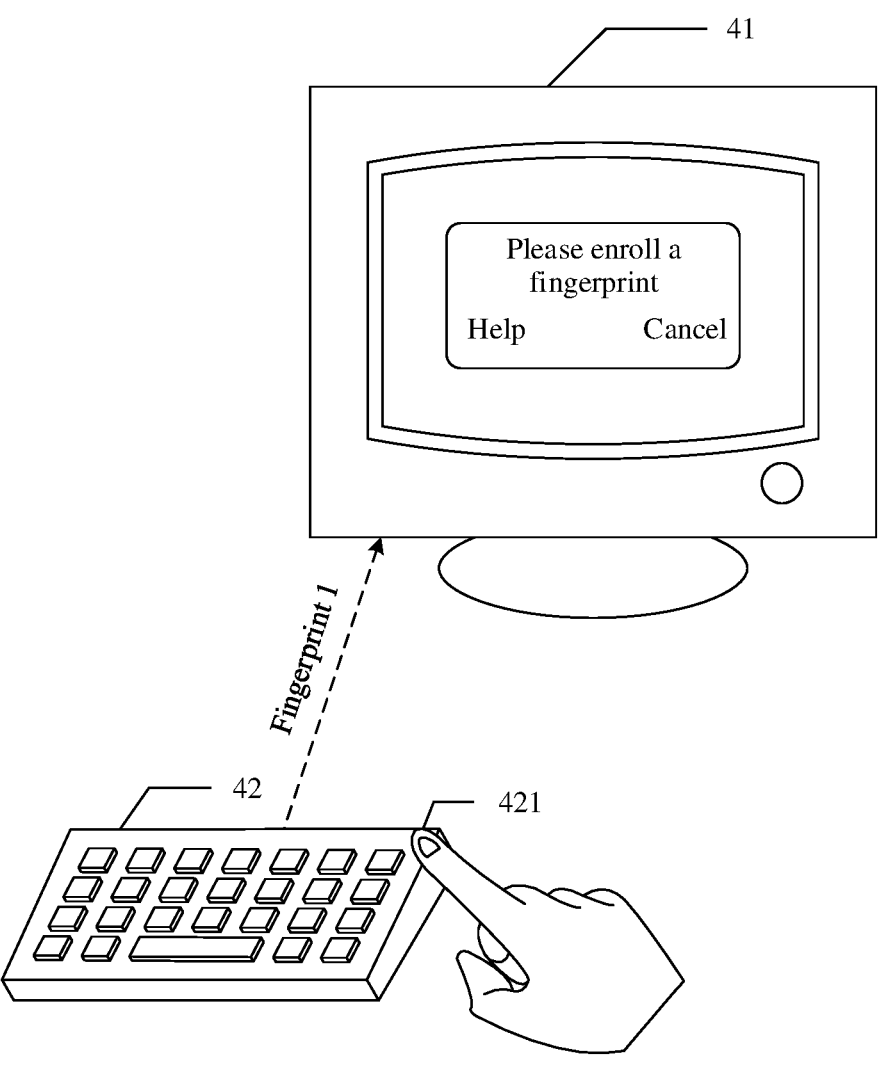
FIG. 15 is a schematic scenario diagram of another fingerprint enrollment scenario according to an embodiment of this application.

Application Scenario 4:

As shown in FIG. 15, it is assumed that the electronic device is an all-in-one machine 41, and the accessory device is a Bluetooth keyboard 42. The all-in-one machine 41 and the Bluetooth keyboard 42 each are provided with a Bluetooth module, and a Bluetooth connection is established by using the Bluetooth modules.

After the Bluetooth connection is established, the all-in-one machine 41 detects that fingerprint data corresponding to the Bluetooth keyboard 42 is not locally stored. In this case, the all-in-one machine 41 displays a fingerprint enrollment prompt box on a display, to prompt the user to re-enroll fingerprint data.

It is assumed that after viewing the fingerprint enrollment prompt box, the user touches a fingerprint sensor 421 of a fingerprint collection module of the Bluetooth keyboard 42 by using a finger.

In this case, the Bluetooth keyboard 42 may collect fingerprint data (namely, a fingerprint 1) of the user in response to the touch operation performed by the user on the fingerprint sensor 421.

Then, the Bluetooth keyboard 42 sends the fingerprint 1 to the all-in-one machine 41. After receiving the fingerprint 1, the all-in-one machine 41 performs quality detection on the fingerprint 1.

Figure 16:
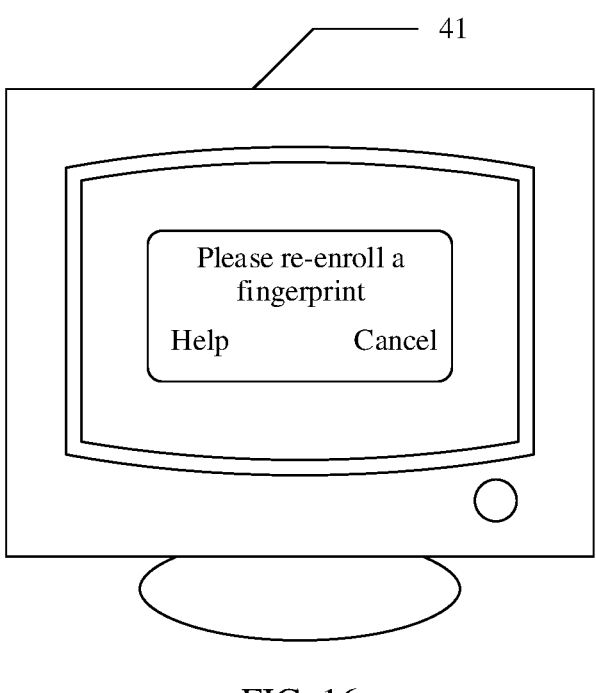
FIG. 16 is a schematic scenario diagram of another fingerprint enrollment scenario according to an embodiment of this application.

As shown in FIG. 16, it is assumed that quality of the fingerprint 1 is poor, and the quality detection fails. In this case, the all-in-one machine 41 displays a re-enrollment prompt box on the display, to prompt the user to re-enroll fingerprint data.

Figure 17:
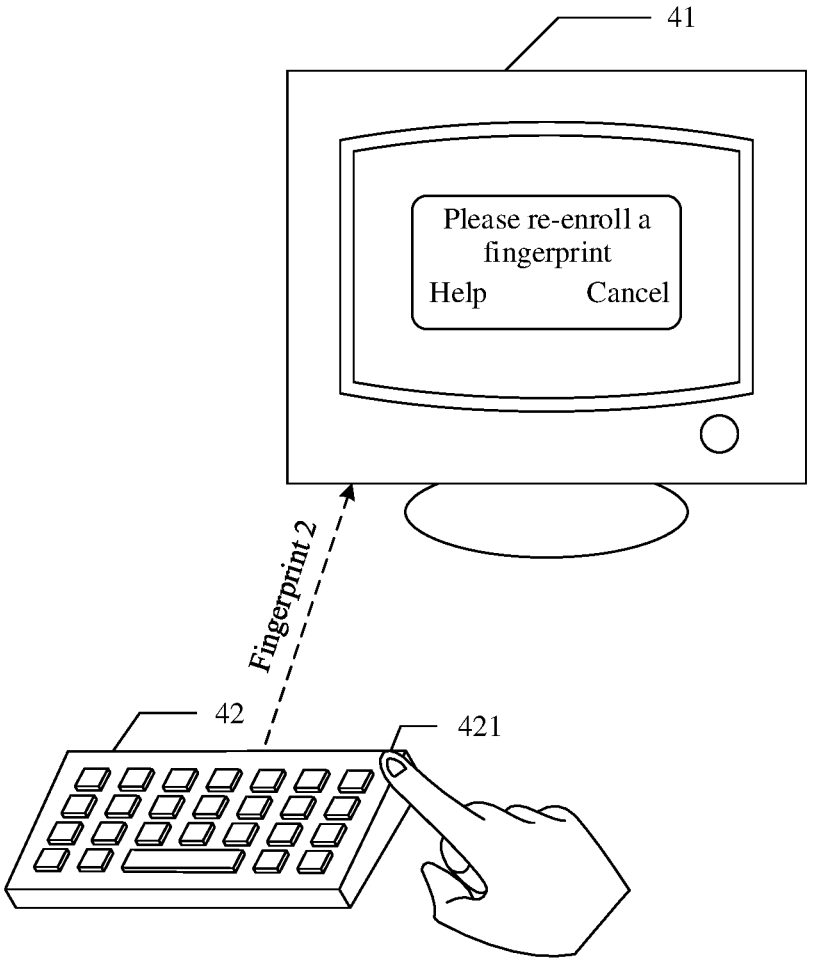
FIG. 17 is a schematic scenario diagram of another fingerprint enrollment scenario according to an embodiment of this application.

As shown in FIG. 17, it is assumed that after viewing re-enrollment prompt information in the re-enrollment prompt box, the user touches the fingerprint sensor 421 again by using the finger. In this case, the Bluetooth keyboard 42 may re-collect fingerprint data (namely, a fingerprint 2) of the user in response to the touch operation of the user.

Then, the Bluetooth keyboard 42 sends the fingerprint 2 to the all-in-one machine 41. After receiving the fingerprint 2, the all-in-one machine 41 performs quality detection on the fingerprint 2.

Figure 18:
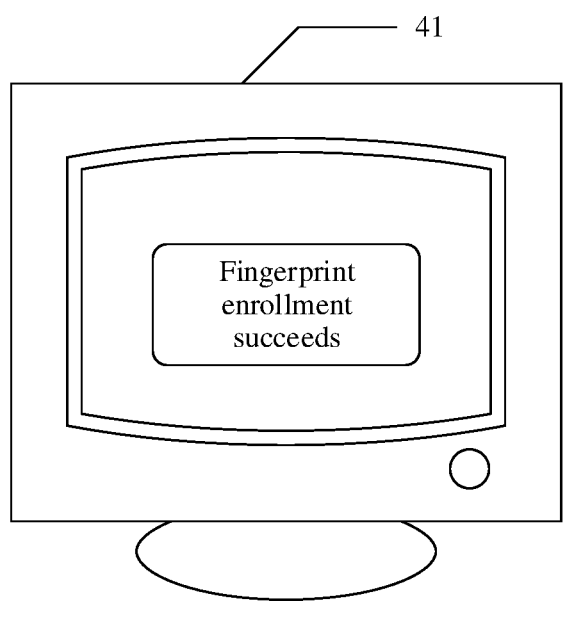
FIG. 18 is a schematic scenario diagram of another fingerprint enrollment scenario according to an embodiment of this application.

As shown in FIG. 18, it is assumed that quality detection on the fingerprint 2 succeeds. In this case, the all-in-one machine stores the fingerprint 2, and displays "Fingerprint enrollment succeeds" on the display, to prompt the user that the fingerprint data is successfully enrolled, and the fingerprint enrollment operation is completed.

It may be understood that the electronic device and the accessory device may perform the fingerprint enrollment operation during first pairing, or the electronic device and the accessory device may perform the fingerprint enrollment operation at another time.

For example, after the electronic device is paired with the accessory device for the first time, the user may be prompted to enroll the fingerprint data. In this case, if the user touches the fingerprint sensor of the fingerprint collection module, the fingerprint sensor collects the fingerprint data of the user, and performs the fingerprint enrollment operation. In such a scenario, the electronic device and the accessory device perform the fingerprint enrollment operation during first pairing.

Alternatively, after the electronic device is paired with the accessory device for the first time, the user is prompted to enroll the fingerprint data, but the user refuses to enroll the fingerprint data. In this case, the fingerprint sensor does not perform the fingerprint enrollment operation.

Then, when the electronic device is paired with the accessory device again, the electronic device or the accessory device detects that the fingerprint data of the user is not enrolled, and prompts the user again to enroll the fingerprint data. The user touches the fingerprint sensor of the fingerprint collection module, and the fingerprint sensor collects the fingerprint data of the user, to perform the fingerprint enrollment operation. In such a scenario, the electronic device and the accessory device do not perform the fingerprint enrollment operation during first pairing.

In addition, in the foregoing descriptions, the fingerprint enrollment operation is automatically initiated by the electronic device or the accessory device. However, in some other possible implementations, the fingerprint enrollment operation may alternatively be actively triggered by the user. The user may perform a specific operation on the electronic device or the accessory device. Then, in response to the operation of the user, the electronic device or the accessory device performs the fingerprint enrollment operation, enrolls new fingerprint data, and adds the new fingerprint data locally, or replaces previously stored fingerprint data with the new fingerprint data. A trigger condition of the fingerprint enrollment operation is not limited in this application.

In addition, the electronic device and/or the accessory device may store one or more pieces of user fingerprint data. When a plurality of pieces of fingerprint data are stored in the electronic device and/or the accessory device, the plurality of pieces of fingerprint data may be fingerprint data of different fingers of a same user, or may be fingerprint data of fingers of different users. A quantity of fingerprint data stored in the electronic device and the accessory device and a source object of the fingerprint data are not limited in this application.

When the fingerprint data of the user is stored in the accessory device, an association relationship needs to be established between the fingerprint data prestored in the accessory device and the electronic device. When the accessory device is connected to a new electronic device, the accessory device needs to re-execute the fingerprint enrollment operation, and enrolls fingerprint data associated with the new electronic device.

For example, when an electronic device A is paired with an accessory device B, the accessory device B enrolls fingerprint data a. In this case, the accessory device B associates the electronic device A with the fingerprint data a, and the fingerprint data a is valid only when the electronic device A is paired with the accessory device B. When the accessory device B is paired with an electronic device C, the accessory device B and the electronic device C need to re-execute the fingerprint enrollment operation, and enroll fingerprint data c. The accessory device B associates the electronic device C with the fingerprint data c, and the fingerprint data c is valid only when the accessory device B is paired with the electronic device C.

When the fingerprint data of the user is stored in the electronic device, the accessory device needs to transfer collected fingerprint data to the electronic device. Because the fingerprint data is important privacy information, before transferring the fingerprint data, the accessory device may perform a confidential operation on the fingerprint data.

A confidential operation manner may be set based on an actual requirement. For example, in some embodiments, before transmitting the fingerprint data, the accessory device may encrypt the fingerprint data based on an encryption manner pre-agreed with the electronic device, and transmit the fingerprint data in a form of fingerprint encrypted data. Alternatively, in some other embodiments, the accessory device may create an upper-layer secure transmission channel (for example, a transport layer security (Transport Layer Security, TLS) channel) to the electronic device based on a wireless connection, and transmit the fingerprint data through the secure transmission channel. Alternatively, in some other embodiments, the foregoing two manners may be combined. The accessory device may first encrypt the fingerprint data, and then transmit fingerprint encrypted data through a secure transmission channel. Alternatively, the accessory device may perform another confidential operation. A specific implementation of the confidential operation is not limited in this embodiment of this application.

3. Fingerprint Verification and Device Starting

After the electronic device or the accessory device enrolls the fingerprint data of the user, the user may quickly start the electronic device by using the accessory device.

When the user wants to start the electronic device by using the accessory device, the user may perform a starting operation on the fingerprint collection module of the accessory device. For example, the user may touch and hold the fingerprint sensor of the fingerprint collection module by using the finger.

In this case, the accessory device may collect to-be-verified fingerprint data by using the fingerprint collection module in response to the starting operation performed by the user on the fingerprint collection module.

In a possible implementation, the fingerprint data of the user is stored on the accessory device. In this case, the accessory device may match the to-be-verified fingerprint data with the fingerprint data prestored in the device.

If the to-be-verified fingerprint data successfully matches the prestored fingerprint data, it indicates that verification succeeds, and identity verification of the user succeeds. The accessory device may send a first turn-on instruction to the electronic device by using the second wireless communication module.

When the electronic device receives the first turn-on instruction by using the first wireless communication module, the first wireless communication module may send a trigger signal to a power module of the electronic device.

When the power module receives the trigger signal, the power module may perform a power-on operation to supply power to each module of the electronic device, to start the electronic device.

If the to-be-verified fingerprint data fails to match prestored fingerprint data, it indicates that verification fails, and identity verification of the user fails. The accessory device may not perform another operation, or the accessory device may provide a prompt in a preset prompt manner (namely, the foregoing first feedback), so that the user learns that the identity verification fails.

Figure 19:
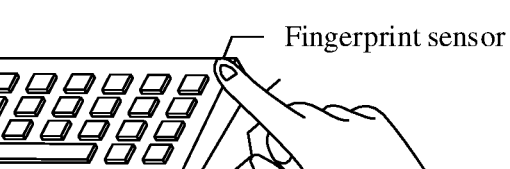
FIG. 19 is a schematic scenario diagram of a prompt manner according to an embodiment of this application.
Figure 20:
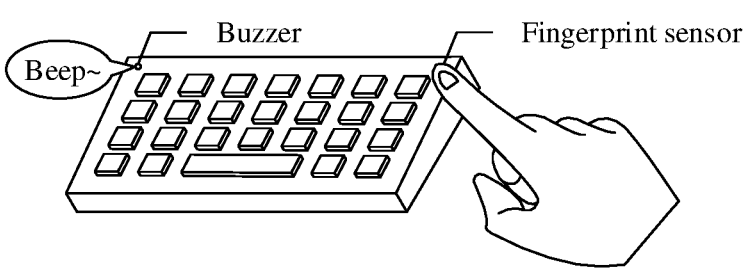
FIG. 20 is a schematic scenario diagram of another prompt manner according to an embodiment of this application.
Figure 21:
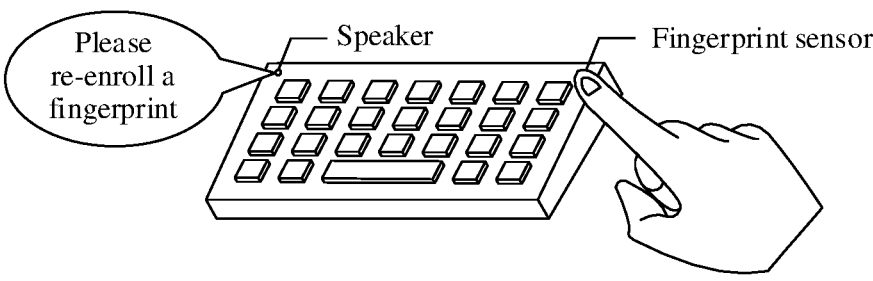
FIG. 21 is a schematic scenario diagram of another prompt manner according to an embodiment of this application.

The preset prompt manner may be set based on an actual situation. For example, as shown in FIG. 19, when the identity verification fails, the accessory device may prompt the user in a vibration manner, so that the user learns that the identity verification fails. Alternatively, as shown in FIG. 20, when the accessory device is provided with a buzzer, if the identity verification fails, the accessory device may alternatively control the buzzer to make a "beep ~" sound, so that the user learns that the identity verification fails based on the sound of the buzzer. Alternatively, as shown in FIG. 21, when the accessory device is provided with a speaker, if the identity verification fails, the accessory device may alternatively control the speaker to broadcast "Please re-enroll a fingerprint", so that the user learns that the identity verification fails after hearing the voice broadcast, and re-enrolls a fingerprint for verification. Alternatively, the accessory device may prompt the user in another prompt manner. Alternatively, the accessory device may prompt the user in a combination of a plurality of different prompt manners. A specific form of the preset prompt manner is not limited in this application.

Figure 22:
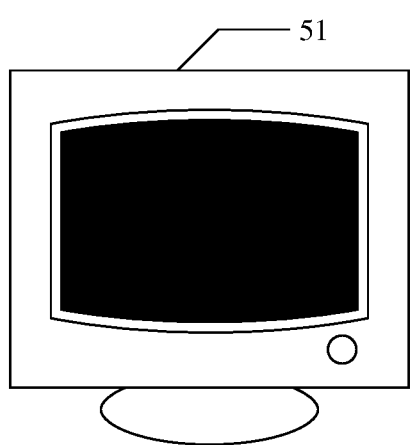
FIG. 22 is a schematic scenario diagram of a device starting scenario according to an embodiment of this application.
Figure 22:
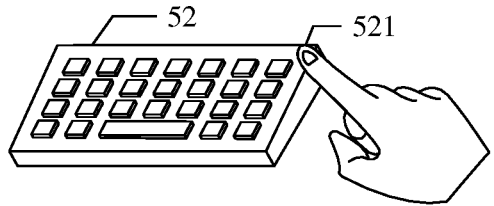

Application Scenario 5:

As shown in FIG. 22, it is assumed that the electronic device is an all-in-one machine 51, and the accessory device is a Bluetooth keyboard 52. The all-in-one machine 51 and the Bluetooth keyboard 52 each are provided with a Bluetooth module.

At a first moment, the all-in-one machine 51 is powered off, and a Bluetooth function of a main system is disabled. Then, the Bluetooth module of the all-in-one machine 51 enters a Bluetooth subsystem, and re-establishes a Bluetooth connection to the Bluetooth module of the Bluetooth keyboard 52.

At a second moment, the user wants to start the all-in-one machine 51, and places a finger on a fingerprint sensor 521 of the Bluetooth keyboard 52. In response to the operation of the user, the Bluetooth keyboard 52 collects to-be-verified fingerprint data by using the fingerprint sensor 521.

Then, the Bluetooth keyboard 52 matches the to-be-verified fingerprint data with fingerprint data prestored in the device.

Figure 23:
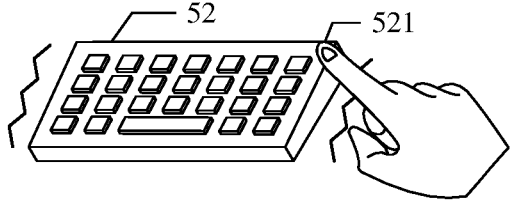
FIG. 23 is a schematic scenario diagram of another device starting scenario according to an embodiment of this application.

As shown in FIG. 23, the to-be-verified fingerprint data fails to match the prestored fingerprint data, and the Bluetooth keyboard 52 prompts, in a vibration manner, the user that identity verification fails.

Figure 24:
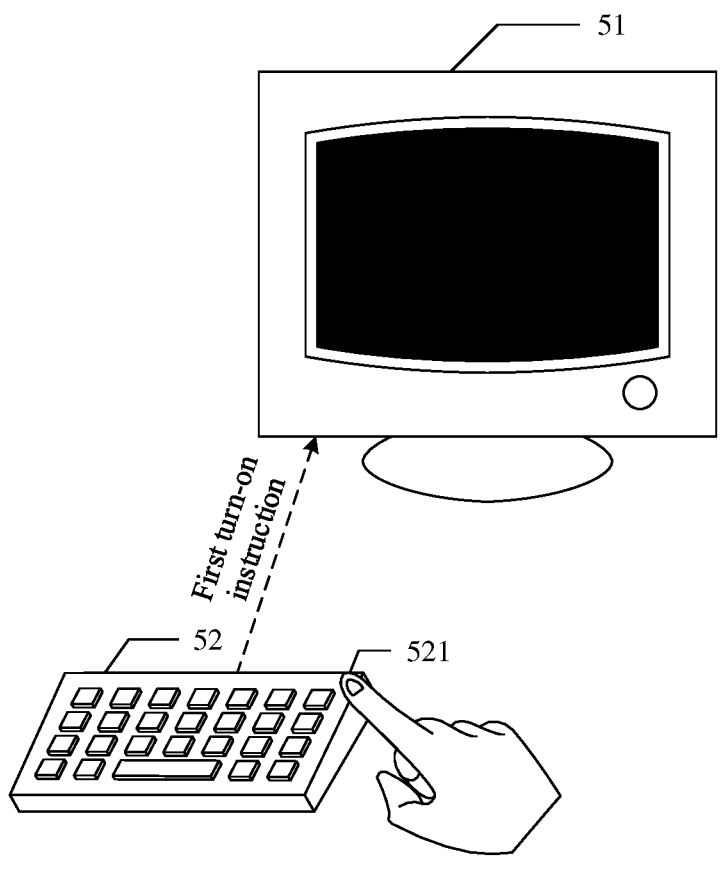
FIG. 24 is a schematic scenario diagram of another device starting scenario according to an embodiment of this application.

As shown in FIG. 24, the user places the finger on the fingerprint sensor 521 again. The Bluetooth keyboard 52 re-collects to-be-verified fingerprint data in response to the operation of the user.

Then, the Bluetooth keyboard 52 matches the new to-be-verified fingerprint data with the prestored fingerprint data. The new to-be-verified fingerprint data successfully matches the prestored fingerprint data, and the Bluetooth keyboard 52 sends a first turn-on instruction to the all-in-one machine 51 through the Bluetooth connection.

When the Bluetooth module of the all-in-one machine 51 receives the first turn-on instruction, the Bluetooth module of the all-in-one machine 51 sends a trigger signal to a power module of the all-in-one machine 51.

After detecting the trigger signal, the power module of the all-in-one machine 51 performs a power-on operation, to supply power to a module such as a processor of the all-in-one machine 51, and start the all-in-one machine 51.

Figure 25:
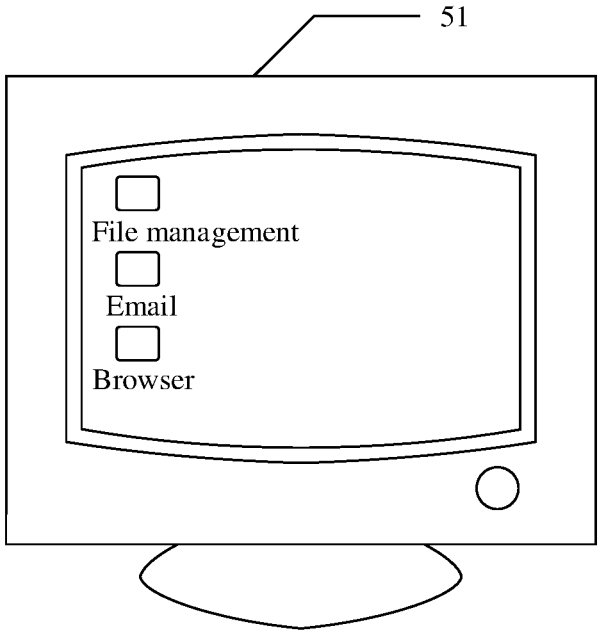
FIG. 25 is a schematic scenario diagram of another device starting scenario according to an embodiment of this application.
Figure 25:
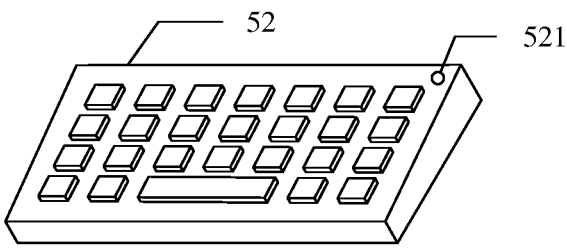

As shown in FIG. 25, after the all-in-one machine 51 is started, the main system is loaded, and a home screen is entered. A device starting process is completed.

In another possible implementation, the fingerprint data of the user is stored on the electronic device. In this case, the accessory device may send the to-be-verified fingerprint data to the first wireless communication module of the electronic device by using the second wireless communication module.

When the electronic device receives the to-be-verified fingerprint data by using the first wireless communication module, the first wireless communication module may transfer the to-be-verified fingerprint data to a fingerprint processing module of the electronic device.

When the fingerprint processing module receives the to-be-verified fingerprint data, the fingerprint processing module may match the to-be-verified fingerprint data with the fingerprint data prestored in the device.

If the to-be-verified fingerprint data successfully matches the prestored fingerprint data, it indicates that identity verification succeeds, and the fingerprint processing module may return a second turn-on instruction to the first wireless communication module.

When the first wireless communication module receives the second turn-on instruction, the first wireless communication module may send a trigger signal to the power module of the electronic device.

When the power module receives the trigger signal, the power module may perform the power-on operation, to supply power to each module of the electronic device, and start the electronic device.

If the to-be-verified fingerprint data fails to match the prestored fingerprint data, it indicates that identity verification fails, and the fingerprint processing module discards the to-be-verified fingerprint data without making any response, or the fingerprint processing module may return verification failure information to the first wireless communication module.

Then, the electronic device may send the verification failure information to the accessory device by using the first wireless communication module.

When the accessory device receives the verification failure information by using the second wireless communication module, the accessory device may provide a prompt in a preset prompt manner, so that the user learns that the identity verification fails.

Figure 26:
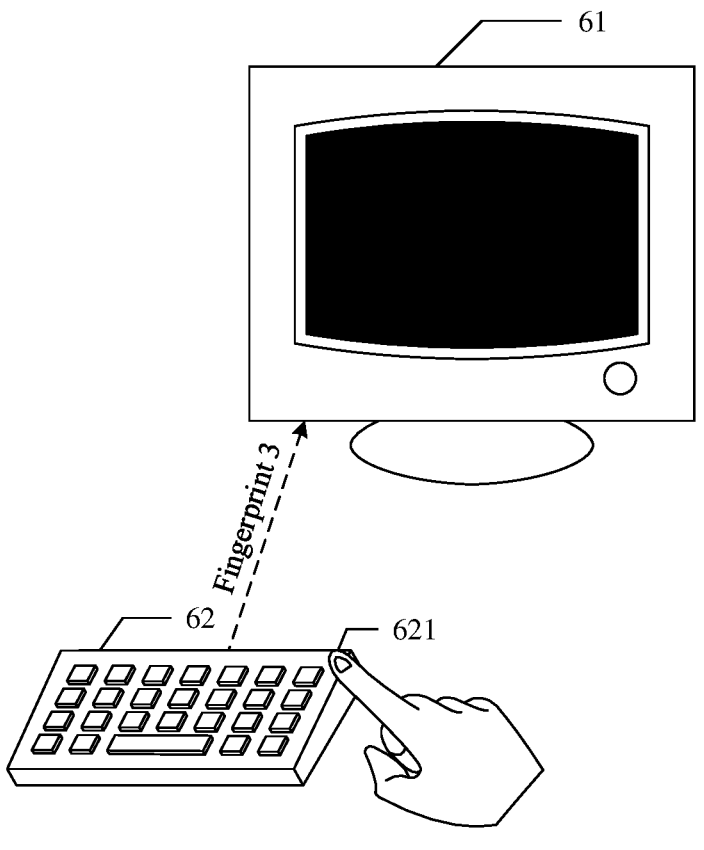
FIG. 26 is a schematic scenario diagram of another device starting scenario according to an embodiment of this application.

Application Scenario 6:

As shown in FIG. 26, it is assumed that the electronic device is an all-in-one machine 61, and the accessory device is a Bluetooth keyboard 62. The all-in-one machine 61 and the Bluetooth keyboard 62 each are provided with a Bluetooth module, the all-in-one machine is provided with a fingerprint processing module, and the fingerprint processing module is an MCU.

At a third moment, the all-in-one machine 61 is powered off, only the Bluetooth module and the MCU remain powered on, and a Bluetooth function of a main system is disabled. The Bluetooth module of the all-in-one machine 61 enters a Bluetooth subsystem, and re-establishes a Bluetooth connection to the Bluetooth module of the Bluetooth keyboard 62.

At a fourth moment, the user wants to start the all-in-one machine 61, and places a finger on a fingerprint sensor 621 of the Bluetooth keyboard 62. In response to the operation of the user, the Bluetooth keyboard 62 collects to-be-verified fingerprint data by using the fingerprint sensor 621.

Then, the Bluetooth keyboard 62 transfers the to-be-verified fingerprint data (namely, a fingerprint 3) to the all-in-one machine 61 through the Bluetooth connection.

When receiving the fingerprint 3, the Bluetooth module of the all-in-one machine 61 transfers the fingerprint 3 to the MCU of the all-in-one machine 61.

When receiving the fingerprint 3, the MCU matches the fingerprint 3 with prestored fingerprint data.

The fingerprint 3 successfully matches the prestored fingerprint data, and the MCU returns a second turn-on instruction to the Bluetooth module of the all-in-one machine 61.

When the Bluetooth module of the all-in-one machine 61 receives the second turn-on instruction, the Bluetooth module of the all-in-one machine 61 sends a trigger signal to a power module of the all-in-one machine 61.

After detecting the trigger signal, the power module of the all-in-one machine 61 performs a power-on operation, to supply power to a module (namely, the foregoing to-be-started module) such as a processor of the all-in-one machine 61, and start the all-in-one machine 61.

Figure 27:
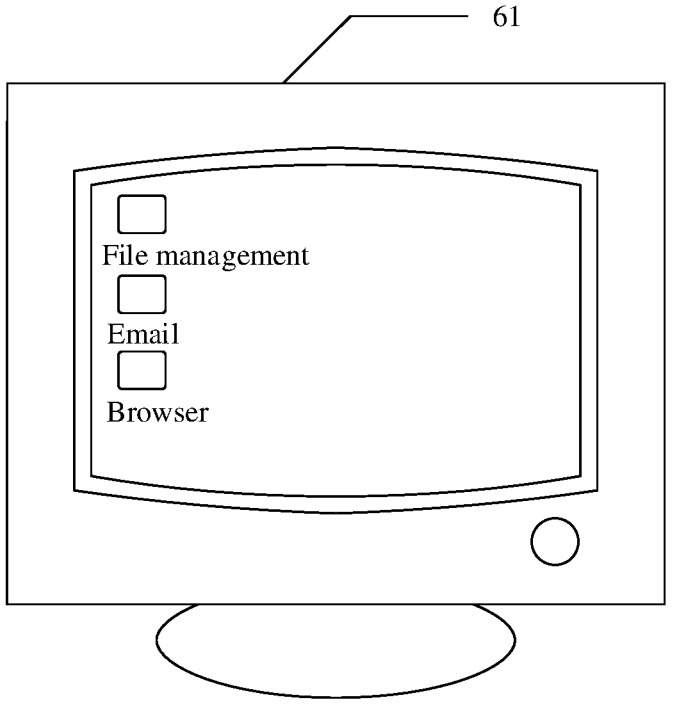
FIG. 27 is a schematic scenario diagram of another device starting scenario according to an embodiment of this application.
Figure 27:
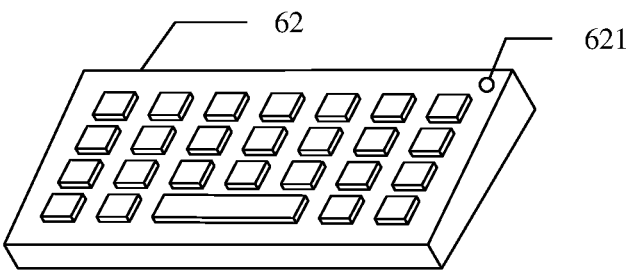

As shown in FIG. 27, after the all-in-one machine 61 is started, the main system is loaded, and a home screen is entered. A device starting process is completed.

It may be understood that, because fingerprint data of each person is different, the electronic device and the accessory device may perform verification on an identity of the user by using the fingerprint data.

When verification performed on the to-be-verified fingerprint data succeeds, it indicates that the identity verification of the user succeeds. Therefore, in a starting process, the electronic device may skip an identity verification process such as account verification, and directly enter a home page of a corresponding account in a main system.

When a plurality of pieces of fingerprint data are prestored in the accessory device and/or the electronic device, the accessory device and/or the electronic device may associate each piece of fingerprint data with a corresponding account. When the to-be-verified fingerprint data is verified to match a piece of prestored fingerprint data, the electronic device may directly enter an account corresponding to the prestored fingerprint data, and no additional account selection and account verification operations are required, thereby simplifying a device starting process.

In addition, in the process in which the accessory device transmits the to-be-verified fingerprint data to the electronic device, the accessory device may perform the confidential operation on the to-be-verified fingerprint data, to avoid endangering privacy security of the user due to leakage of the to-be-verified fingerprint data. For a specific manner of the confidential operation, refer to the foregoing descriptions. Details are not described herein again.

For ease of understanding, the following describes in detail the device starting method provided in embodiments with reference to specific application scenarios.

Figure 28:
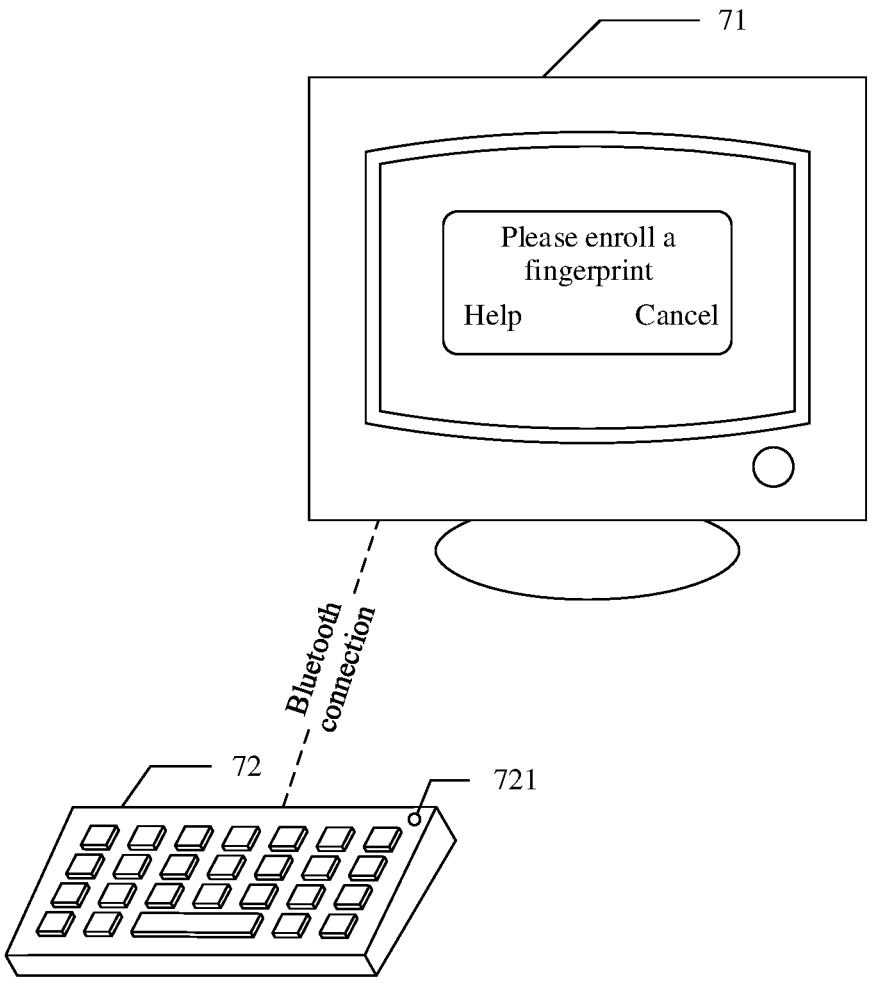
FIG. 28 is a schematic scenario diagram of another device starting scenario according to an embodiment of this application.

Application Scenario 7:

As shown in FIG. 28, it is assumed that the electronic device is an all-in-one machine 71, and the accessory device is a Bluetooth keyboard 72. The all-in-one machine 71 and the Bluetooth keyboard 72 each are provided with a Bluetooth module.

At a fifth moment, the all-in-one machine 71 establishes a Bluetooth connection to the Bluetooth keyboard 72. In this case, the all-in-one machine 71 detects that no fingerprint data of the user is stored on the Bluetooth keyboard 72. Therefore, the all-in-one machine 71 displays a fingerprint enrollment prompt box on a display. The fingerprint enrollment prompt box is used to prompt the user to enroll a fingerprint.

Figure 29:
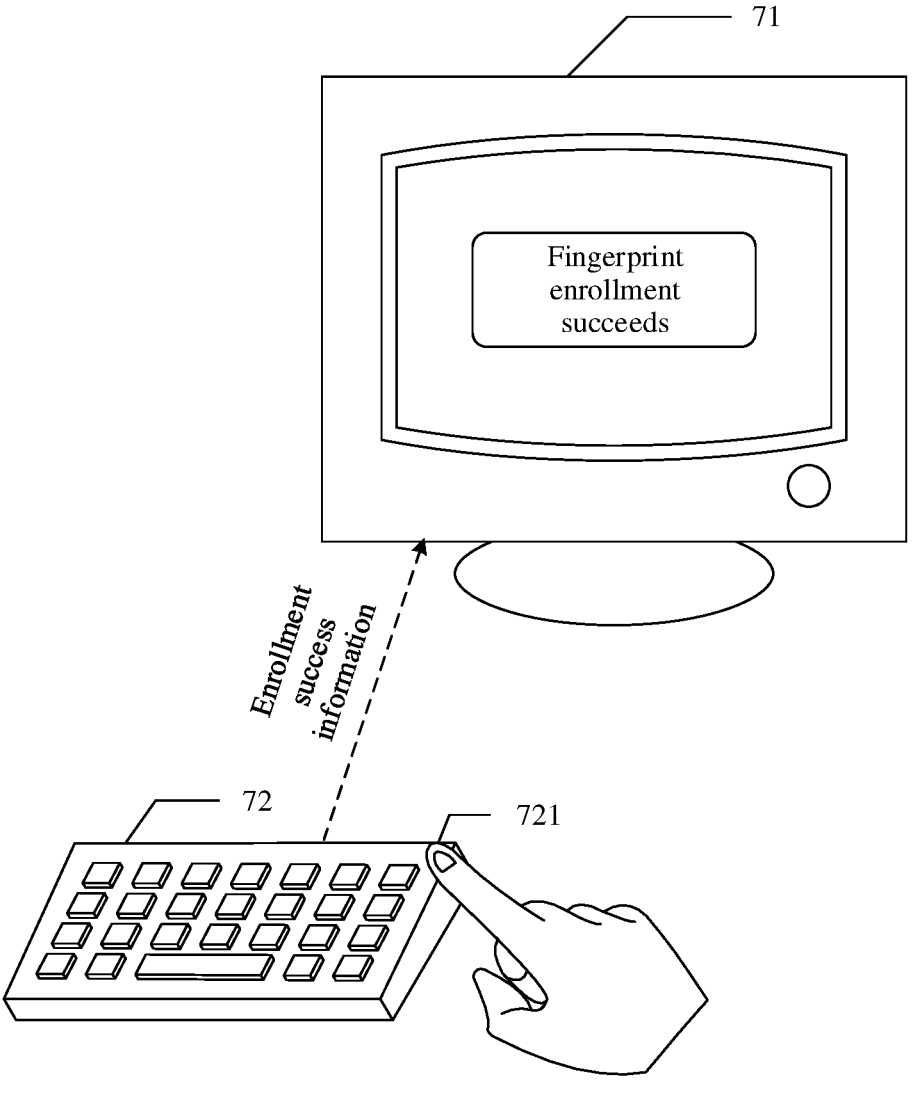
FIG. 29 is a schematic scenario diagram of another device starting scenario according to an embodiment of this application.

As shown in FIG. 29, it is assumed that after viewing the fingerprint enrollment prompt box, the user touches a fingerprint sensor 721 of the Bluetooth keyboard 72 by using a finger.

In this case, in response to the touch operation performed by the user on the fingerprint sensor 721, the Bluetooth keyboard 72 may collect fingerprint data of the user, and perform quality detection on the collected fingerprint data.

Then, the Bluetooth keyboard 72 detects that quality of the fingerprint data meets a requirement, and the quality detection succeeds. In this case, the Bluetooth keyboard 72 stores the fingerprint data enrolled this time, and sends enrollment success information to the all-in-one machine 71.

After receiving the enrollment success information, the all-in-one machine 71 establishes an association relationship between an identifier of the Bluetooth keyboard 72 and a currently logged-in account of the all-in-one machine 71.

Figure 30:
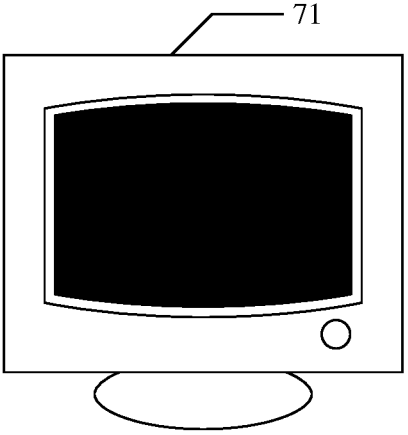
FIG. 30 is a schematic scenario diagram of another device starting scenario according to an embodiment of this application.
Figure 30:
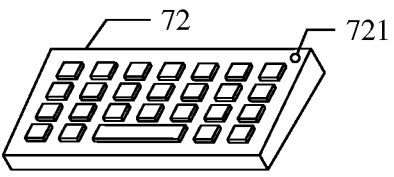
Figure 31:
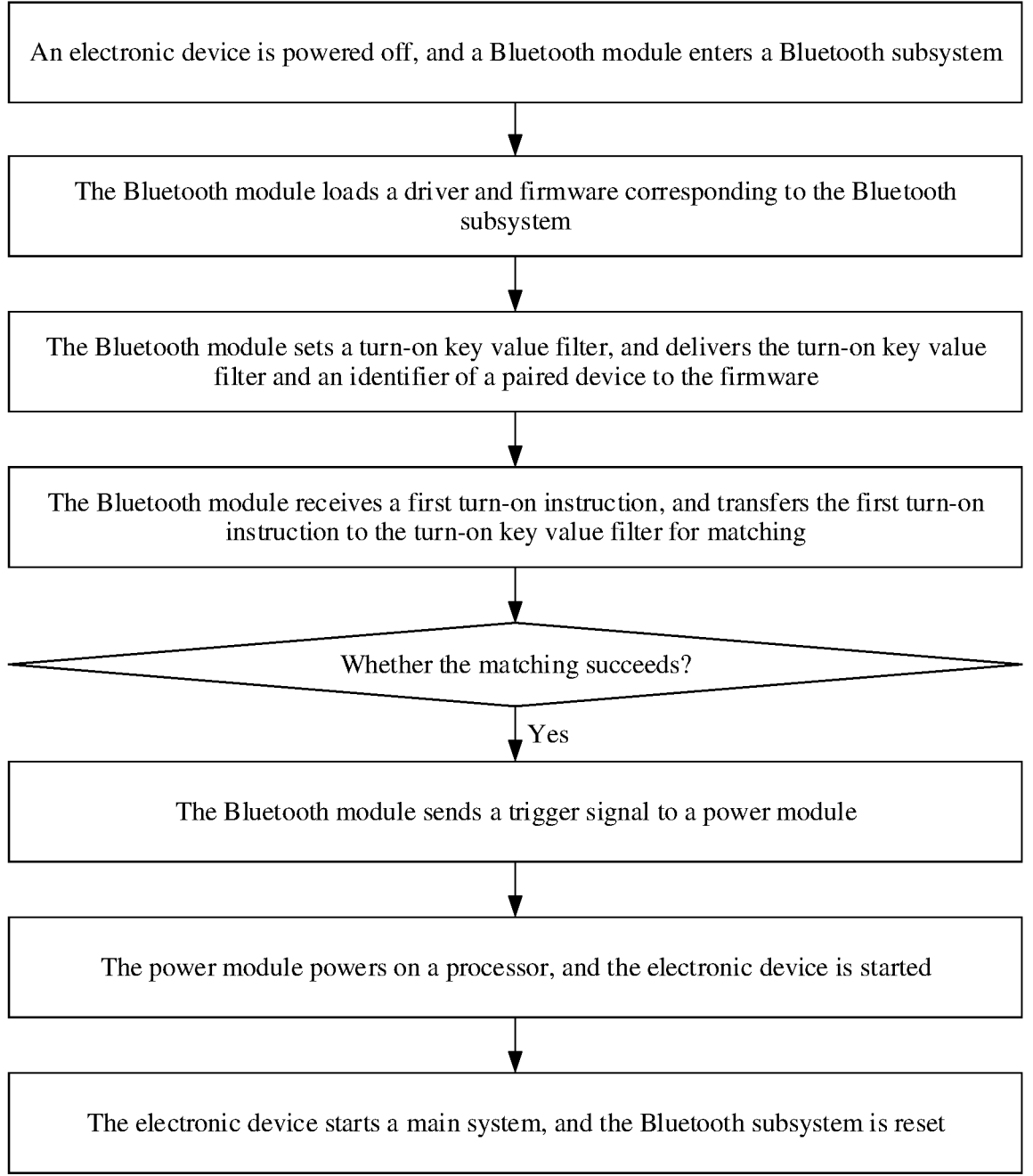
FIG. 31 is a schematic flowchart of a device starting method according to an embodiment of this application.

As shown in FIG. 30 and FIG. 31, at a sixth moment, the all-in-one machine 71 is in a turn-off state. In a turn-off process of the all-in-one machine 71, both a processor and the Bluetooth module of the all-in-one machine 71 are powered off.

Then, a power module of the all-in-one machine 71 sends a subsystem instruction to the Bluetooth module of the all-in-one machine 71, and supplies power to the Bluetooth module of the all-in-one machine 71.

After receiving the subsystem instruction, the Bluetooth module of the all-in-one machine 71 enters a Bluetooth subsystem in response to the subsystem instruction. Then, the Bluetooth module of the all-in-one machine 71 loads a driver and firmware corresponding to the Bluetooth subsystem, and the Bluetooth module of the all-in-one machine 71 sets a turn-on key value filter. The turn-on key value filter is configured to identify a first turn-on instruction. Then, the Bluetooth module delivers the turn-on key value filter and a device identifier of a paired accessory device to the firmware.

After the Bluetooth module of the all-in-one machine 71 enters the Bluetooth subsystem, the Bluetooth module of the all-in-one machine 71 searches for a surrounding connectable electronic device.

When the all-in-one machine 71 detects the Bluetooth keyboard 72, the Bluetooth module of the all-in-one machine 71 re-establishes a Bluetooth connection to the Bluetooth module of the Bluetooth keyboard 72. In addition, the Bluetooth subsystem is provided with a connection keepalive function, and the Bluetooth connection may be maintained by using a self-defined keepalive packet (keep live null packet) and a self-defined interaction period (for example, 10 s).

Figure 32:
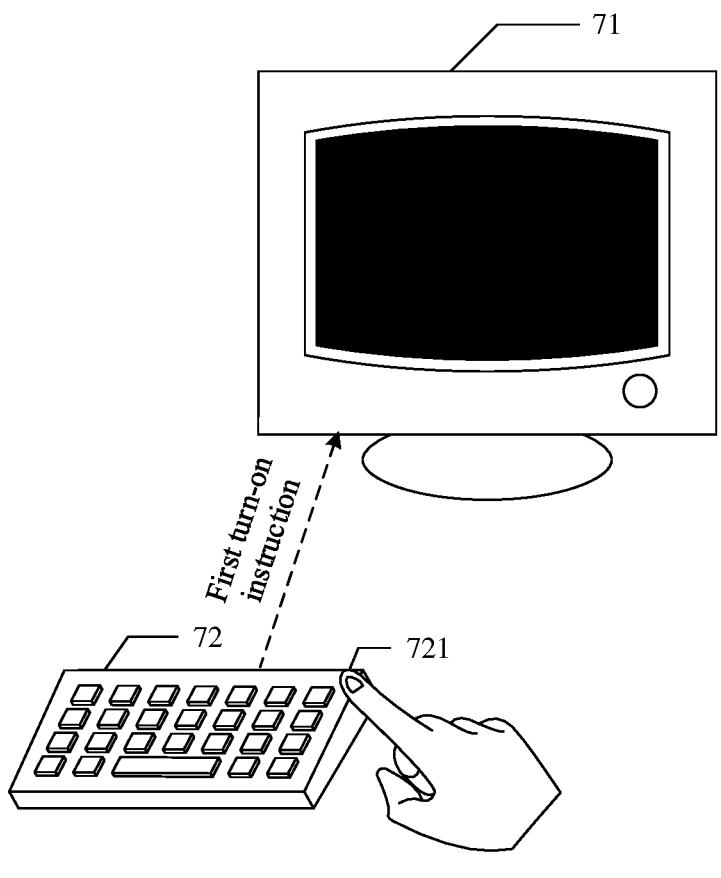
FIG. 32 is a schematic scenario diagram of another device starting scenario according to an embodiment of this application.

As shown in FIG. 32, at a seventh moment, the user wants to start the all-in-one machine 71, and touches the fingerprint sensor 721 of the Bluetooth keyboard 72 by using the finger.

In this case, the Bluetooth keyboard 72 collects current fingerprint data (namely, to-be-verified fingerprint data) of the user in response to the touch operation of the user on the fingerprint sensor 721.

Then, the Bluetooth keyboard 72 matches the to-be-verified fingerprint data with the fingerprint data prestored in the device.

When the Bluetooth keyboard 72 detects that the to-be-verified fingerprint data successfully matches the prestored fingerprint data, the Bluetooth keyboard 72 sends the first turn-on instruction to the all-in-one machine 71 through the Bluetooth connection.

When the Bluetooth module of the all-in-one machine 71 detects the first turn-on instruction, the first turn-on instruction is transferred to the turn-on key value filter for matching. When the turn-on key value filter detects that a device identifier in the first turn-on instruction successfully matches the device identifier of the paired accessory device, the Bluetooth module of the all-in-one machine 71 may transfer a trigger signal to the power module of the all-in-one machine 71 through a general-purpose input/output (General-purpose input/output, GPIO) interface.

When the power module of the all-in-one machine 71 receives the trigger signal, the power module of the all-in-one machine 71 performs a power-on operation, to supply power to each module of the all-in-one machine 71, and start the all-in-one machine 71.

Figure 33:
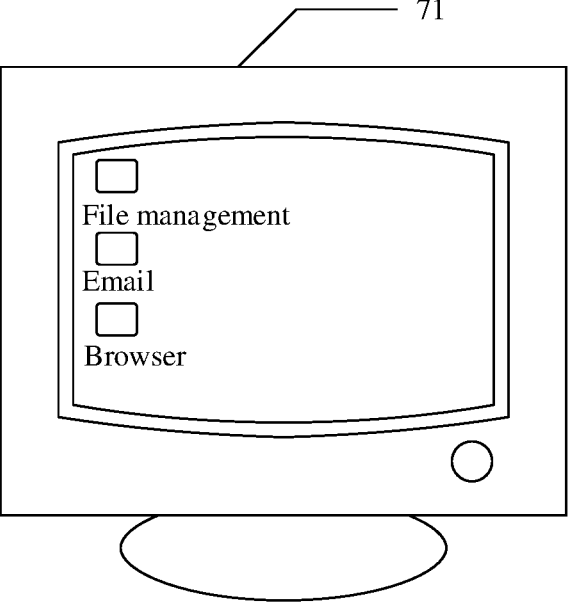
FIG. 33 is a schematic scenario diagram of another device starting scenario according to an embodiment of this application.
Figure 33:
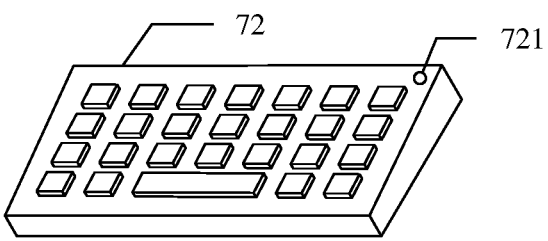

As shown in FIG. 33, when a processor of the all-in-one machine 71 is started, the all-in-one machine 71 loads a main system, skips an account verification operation, and enters a home page of an account corresponding to a device identifier of the Bluetooth keyboard 72.

In addition, the Bluetooth module of the all-in-one machine 71 exits the Bluetooth subsystem, the main system re-enables a Bluetooth function (namely, the foregoing second Bluetooth system), and the all-in-one machine 71 re-establishes a Bluetooth connection to the Bluetooth keyboard 72.

Figure 34:
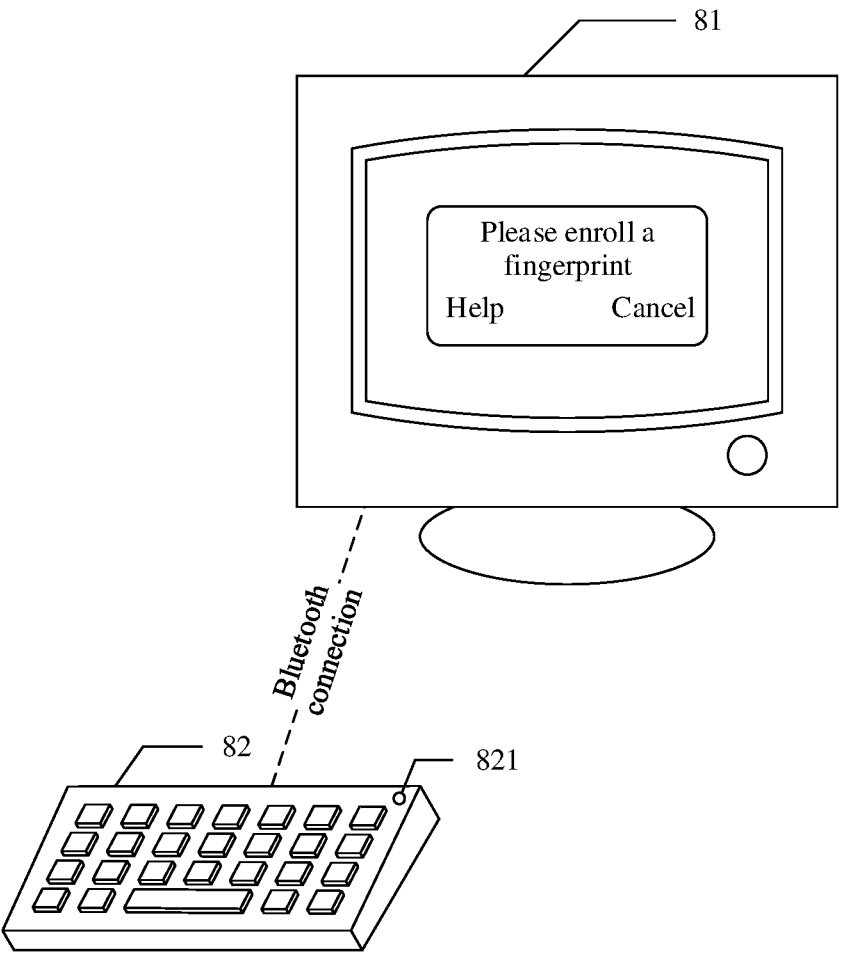
FIG. 34 is a schematic scenario diagram of another device starting scenario according to an embodiment of this application.

Application Scenario 8:

As shown in FIG. 34, it is assumed that the electronic device is an all-in-one machine 81, and the accessory device is a Bluetooth keyboard 82. The all-in-one machine 81 and the Bluetooth keyboard 82 each are provided with a Bluetooth module, the all-in-one machine 81 is provided with a fingerprint processing module, and the fingerprint processing module is an MCU.

At an eighth moment, the all-in-one machine 81 establishes a Bluetooth connection to the Bluetooth keyboard 82. In this case, the all-in-one machine 81 detects that no fingerprint data of the user is stored on the Bluetooth keyboard 82. Therefore, the all-in-one machine 81 displays a fingerprint enrollment prompt box on a display. The fingerprint enrollment prompt box is used to prompt the user to enroll a fingerprint.

Figure 35:
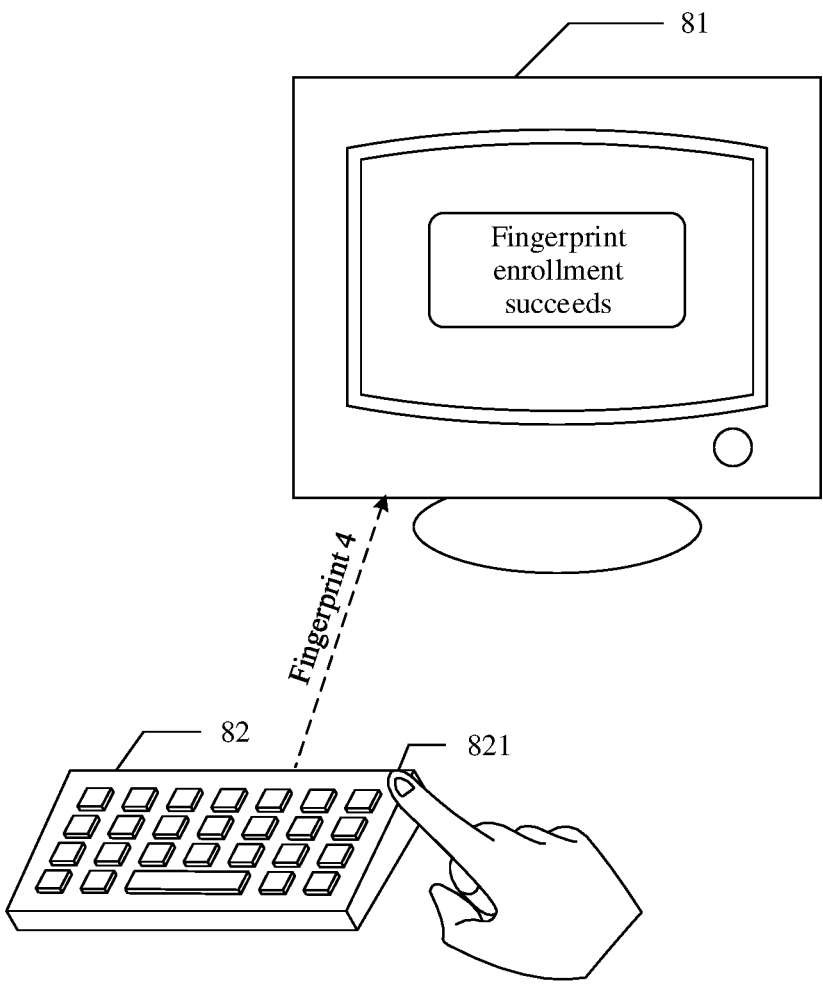
FIG. 35 is a schematic scenario diagram of another device starting scenario according to an embodiment of this application.

As shown in FIG. 35, it is assumed that after viewing the fingerprint enrollment prompt box, the user touches a fingerprint sensor 821 of the Bluetooth keyboard 82 by using a finger.

In this case, the Bluetooth keyboard 82 may collect fingerprint data (namely, a fingerprint 4) of the user in response to the touch operation performed by the user on the fingerprint sensor 821. Then, the Bluetooth keyboard 82 transfers the fingerprint 4 to the all-in-one machine 81 through the Bluetooth connection.

After receiving the fingerprint 4, the all-in-one machine 81 performs quality detection on the fingerprint 4. When the all-in-one machine 81 detects that quality of the fingerprint 4 meets a requirement, after the quality detection succeeds, the all-in-one machine 81 stores the fingerprint 4, establishes an association relationship between the fingerprint 4, a device identifier of the Bluetooth keyboard 82, and a currently logged-in account of the all-in-one machine 81, and displays "Fingerprint enrollment succeeds" on the display.

Figure 36:
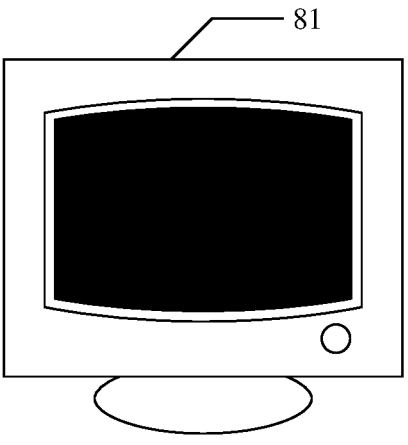
FIG. 36 is a schematic scenario diagram of another device starting scenario according to an embodiment of this application.
Figure 36:
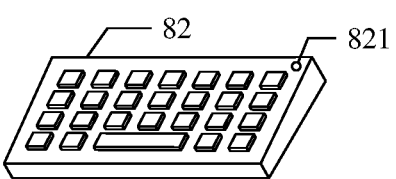

As shown in FIG. 36, at a ninth moment, the all-in-one machine 81 is powered off, only the Bluetooth module and the MCU remain powered on, and a Bluetooth function of a main system is disabled.

Then, the Bluetooth module of the all-in-one machine 81 enters a Bluetooth subsystem, loads a driver and firmware corresponding to the Bluetooth subsystem, and sets a turn-on key value filter. The turn-on key value filter is configured to identify a second turn-on instruction. Then, the Bluetooth module of the all-in-one machine 81 delivers the turn-on key value filter and a device identifier of a paired accessory device to the firmware.

After the Bluetooth module of the all-in-one machine 81 enters the Bluetooth subsystem, the Bluetooth module of the all-in-one machine 81 may search for a surrounding connectable electronic device.

When the all-in-one machine 81 detects the Bluetooth keyboard 82, the Bluetooth module of the all-in-one machine 81 re-establishes a Bluetooth connection to the Bluetooth module of the Bluetooth keyboard 82.

Figure 37:
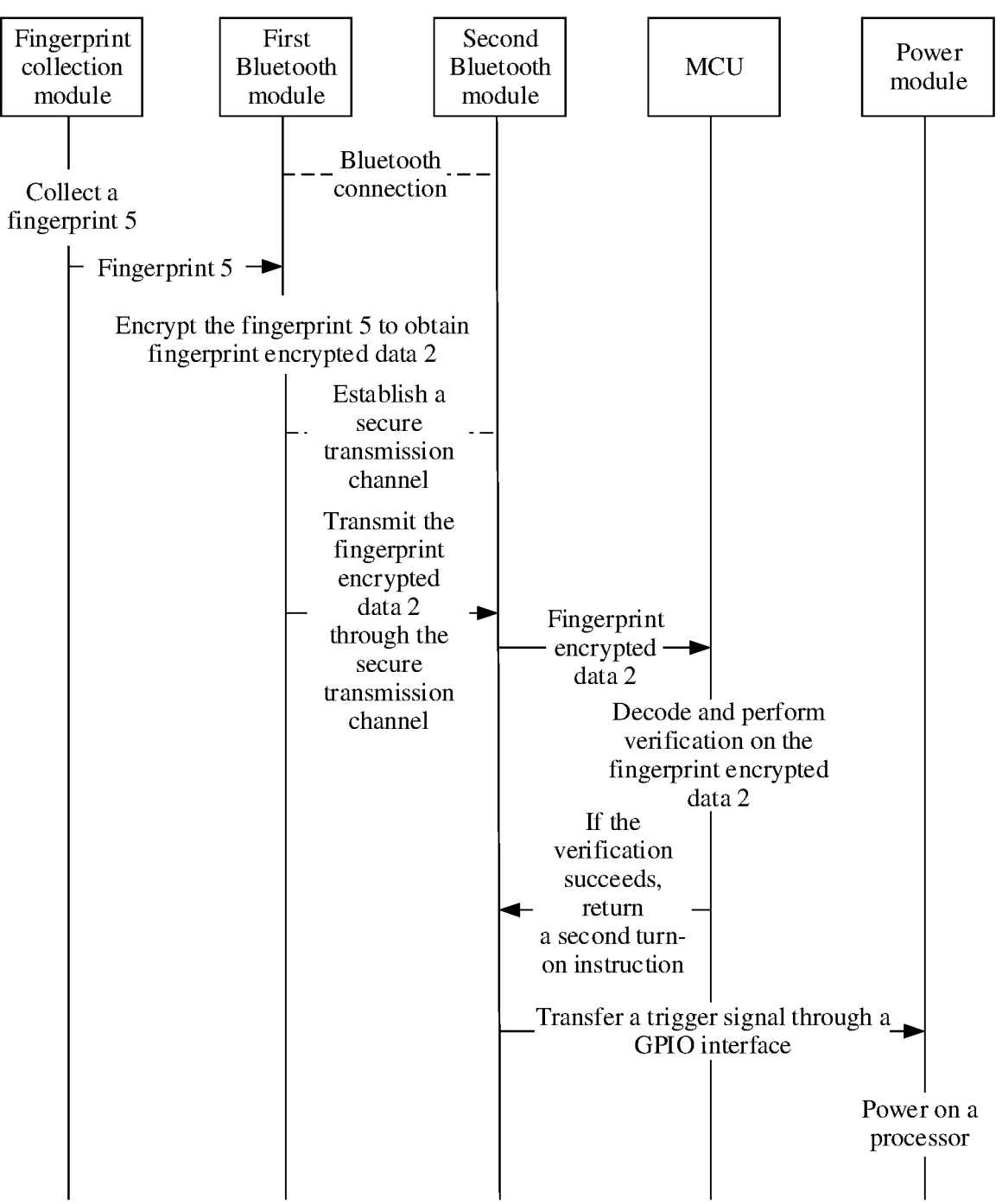
FIG. 37 is a schematic flowchart of another device starting method according to an embodiment of this application.
Figure 38:
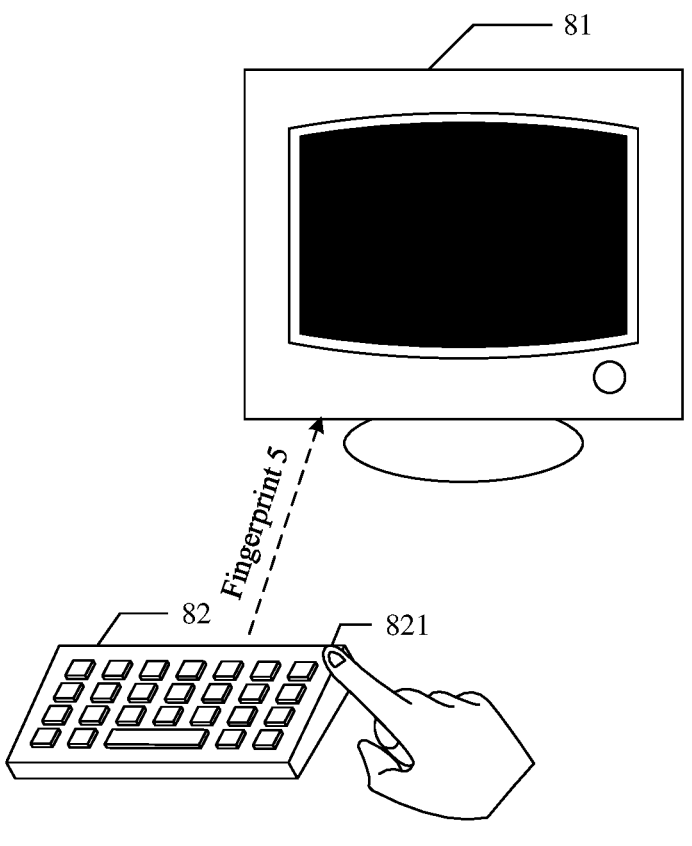
FIG. 38 is a schematic scenario diagram of another device starting scenario according to an embodiment of this application.

As shown in FIG. 37 and FIG. 38, at a tenth moment, the user wants to start the all-in-one machine 81, and touches the fingerprint sensor 821 of the Bluetooth keyboard 82 by using the finger.

In this case, the Bluetooth keyboard 82 collects current fingerprint data (namely, a fingerprint 5) of the user in response to the touch operation performed by the user on the fingerprint sensor 821.

Then, a fingerprint collection module of the Bluetooth keyboard 82 transfers the fingerprint 5 to a Bluetooth module (namely, a first Bluetooth module) of the Bluetooth keyboard 82.

After obtaining the fingerprint 5, the first Bluetooth module may encrypt the fingerprint 5 based on a preset encryption manner, to obtain fingerprint encrypted data 1.

In addition, the first Bluetooth module may establish a TLS channel (namely, a secure transmission channel) with a Bluetooth module (namely, a second Bluetooth module) of the all-in-one machine 81 based on the Bluetooth connection.

The first Bluetooth module transmits the fingerprint encrypted data 1 to the second Bluetooth module through the TLS channel.

When receiving the fingerprint encrypted data 1, the second Bluetooth module transfers the fingerprint encrypted data 1 to the MCU of the all-in-one machine 81.

When the MCU receives the fingerprint encrypted data 1, the MCU decodes and verifies the fingerprint encrypted data 1, and matches the fingerprint 5 obtained through decoding with prestored fingerprint data.

When the MCU detects that the fingerprint 5 successfully matches the prestored fingerprint data, the MCU returns the second turn-on instruction to the first Bluetooth module.

When the first Bluetooth module detects the second turn-on instruction by using the turn-on key value filter, the first Bluetooth module transfers a trigger signal to a power module of the all-in-one machine 81 through a GPIO interface.

When the power module of the all-in-one machine 81 receives the trigger signal, the power module of the all-in-one machine 81 performs a power-on operation, to supply power to each module of the all-in-one machine 81, and start the all-in-one machine 81.

Figure 39:
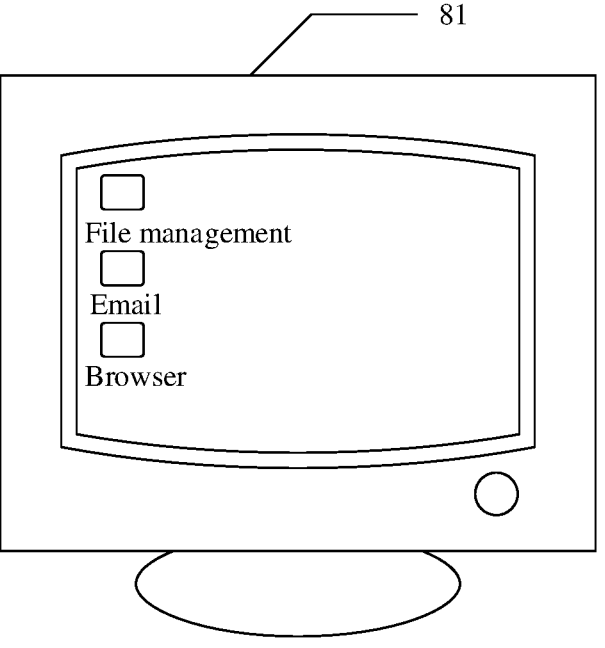
FIG. 39 is a schematic scenario diagram of another device starting scenario according to an embodiment of this application.
Figure 39:
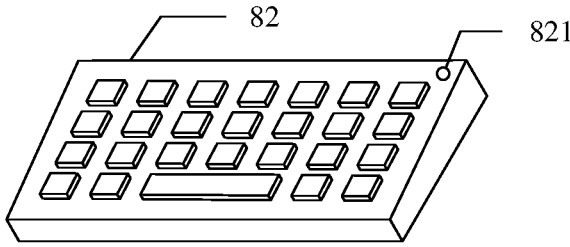

As shown in FIG. 39, when a processor of the all-in-one machine 81 is started, the all-in-one machine 81 loads a main system, skips an account verification operation, and enters a home page of an account corresponding to the fingerprint 5.

In addition, the Bluetooth module of the all-in-one machine 81 exits the Bluetooth subsystem, and the main system starts the Bluetooth function to re-establish a Bluetooth connection to the Bluetooth keyboard 82.

In conclusion, in the device starting method provided in embodiments, the fingerprint data of the user may be prestored in the accessory device or the electronic device. When the electronic device is in a turn-off state, the user may perform a starting operation on the fingerprint collection module of the accessory device. The fingerprint collection module of the accessory device collects to-be-verified fingerprint data in response to the starting operation, and locally verifies the to-be-verified fingerprint data, or transmits the to-be-verified fingerprint data to the electronic device for verification.

Fingerprint data of each person is unique. Therefore, if the verification performed on the to-be-verified fingerprint data succeeds, it indicates that the identity verification of the user succeeds. The first wireless communication module of the electronic device sends a trigger signal to the power module, and the power module powers on each module of the electronic device, to start the electronic device.

In a starting process of the electronic device, the user only needs to enter the to-be-verified fingerprint data, and does not need to perform another operation. This greatly simplifies the starting process of the electronic device, and the user does not need to manually perform a large quantity of operations, thereby reducing time consumed for starting the electronic device, and improving user experience.

It should be understood that sequence numbers of the steps do not mean an execution sequence in embodiments. The execution sequence of the processes needs to be determined based on functions and internal logic of the processes, and should not constitute any limitation on the implementation processes of embodiments of this application.

Figure 40:
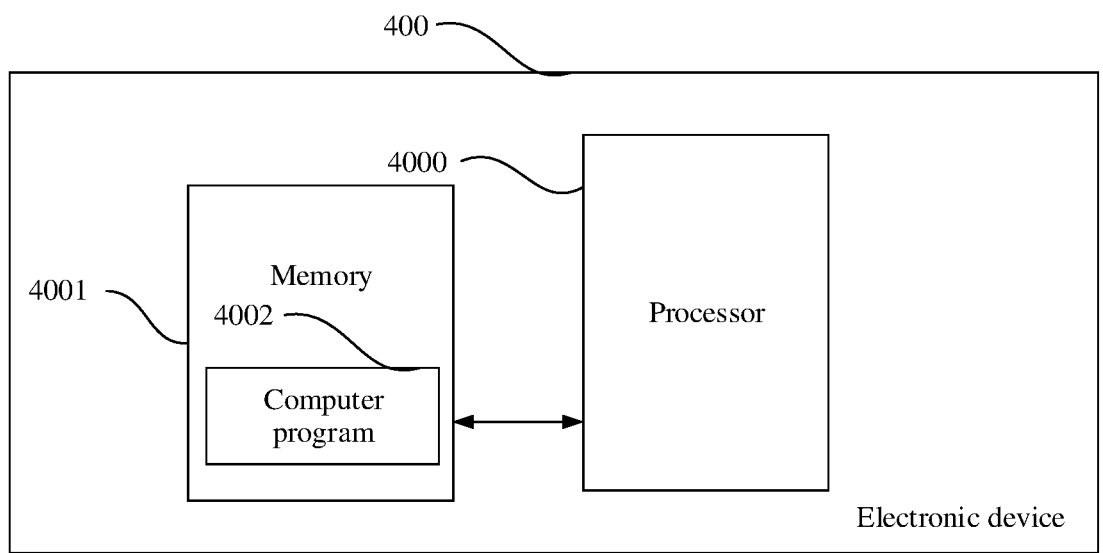
FIG. 40 is a schematic diagram of a structure of another electronic device according to an embodiment of this application.

Refer to FIG. 40. An embodiment of this application further provides an electronic device. As shown in FIG. 40, an electronic device 400 in this embodiment includes a processor 4000, a memory 4001, and a computer program 4002 that is stored in the memory 4001 and that can be run on the processor 4000. When executing the computer program 4002, the processor 4000 implements the steps in embodiments of the screen extension method. Alternatively, when executing the computer program 4002, the processor 4000 implements functions of the modules/units in the apparatus embodiments.

For example, the computer program 4002 may be divided into one or more modules/units. The one or more modules/units are stored in the memory 4001, and are executed by the processor 4000, to complete this application. The one or more modules/units may be a series of computer program instruction segments that can implement a specific function, and the instruction segment is used to describe an execution process of the computer program 4002 in the electronic device 400.

The electronic device 400 may be a computing device such as an all-in-one machine, a desktop computer, a notebook computer, a palmtop computer, or a cloud server. The electronic device may include but is not limited to the processor 4000 and the memory 4001. A person skilled in the art may understand that FIG. 40 is merely an example of the electronic device 400, and does not constitute a limitation on the electronic device 400. The electronic device may include more or fewer components than those shown in the figure, or may combine some components, or may have different components. For example, the electronic device may further include an input/output device, a network access device, or a bus.

The processor 4000 may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, a discrete hardware component, or the like. The general-purpose processor may be a microprocessor, or the processor may be any conventional processor or the like.

The memory 4001 may be an internal storage unit of the electronic device 400, for example, a hard disk or memory of the electronic device 400. The memory 4001 may alternatively be an external storage device of the electronic device 400, for example, a plug-in hard disk, a smart media card (Smart Media Card, SMC), a secure digital (Secure Digital, SD) card, or a flash card (Flash Card) that is disposed on the electronic device 400. Further, the memory 4001 may include both an internal storage unit and an external storage device of the electronic device 400. The memory 4001 is configured to store the computer program and other programs and data required by the electronic device. The memory 4001 may further be configured to temporarily store data that has been output or is to be output.

A person skilled in the art may clearly understand that, for the purpose of convenient and brief description, division of the foregoing functional units and modules is merely used as an example for description. In an actual application, the foregoing functions may be allocated to different functional units and modules for implementation based on a requirement. In other words, an inner structure of the apparatus is divided into different functional units or modules, to implement all or some of the functions described above. Functional units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units or modules in the foregoing system, refer to a corresponding process in the method embodiments. Details are not described herein again.

In the foregoing embodiments, descriptions of all the embodiments have respective focuses. For a part that is not described in detail in an embodiment, refer to related descriptions in another embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, the functional units in embodiments of this application may be integrated into one processing unit, each of the units may physically exist alone, or two or more units may be integrated into one unit. The integrated unit may be implemented in a form of hardware, or may be implemented in a form of a software functional unit.

When the integrated module/unit is implemented in a form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the method embodiments can be implemented. The computer program includes computer program code. The computer program code may be in a source code form, an object code form, an executable file form, some intermediate forms, or the like. The computer-readable storage medium may include any entity or apparatus that can carry the computer program code, a recording medium, a USB flash drive, a removable hard disk, a magnetic disk, a compact disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to legislation and patent practice, the computer-readable storage medium does not include the electrical carrier signal or the telecommunication signal.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A device starting method, comprising:

collecting, by an accessory device, to-be-verified fingerprint data, and sending the to-be-verified fingerprint data to a display device through a Bluetooth connection;

matching, by the display device, based on the display device receiving the to-be-verified fingerprint data, the to-be-verified fingerprint data with pre-stored fingerprint data of a user;

performing, by the display device, based on the to-be-verified fingerprint data successfully matching the pre-stored fingerprint data of the user, a turn-on operation; and outputting, by the display device, based on the to-be-verified fingerprint data failing to match the pre-stored fingerprint data of the user, a second feedback, wherein the second feedback comprises one or more of a vibration feedback, a light feedback, and a sound feedback, wherein the display device comprises a Bluetooth module with a first Bluetooth system and a second Bluetooth system, the first Bluetooth system having reduced functionality comprising receipt of the to-be-verified fingerprint data and link keepalive.

2. The device starting method according to claim 1, wherein the method further comprises, after the performing, by the display device, the turn-on operation:

switching, by the display device, the Bluetooth module of the display device from the first Bluetooth system to the second Bluetooth system, wherein the second Bluetooth system is configured to be paired with the accessory device or an electronic device other than the accessory device.

3. The device starting method according to claim 1, wherein the display device is an all-in-one machine.

4. The device starting method according to claim 1, wherein the accessory device is a Bluetooth keyboard, the Bluetooth keyboard is provided with a fingerprint collection module, and the fingerprint collection module is configured to collect the to-be-verified fingerprint data.

5. The device starting method according to claim 1, wherein the performing, by the display device, the turn-on operation comprises:

controlling, by the display device, a power module of the display device to supply power to each to-be-started module of the display device.

6. The device starting method according to claim 1, wherein the performing, by the display device, the turn-on operation comprises:

turning on, by the display device, a display of the display device.

7. A device starting system, comprising a display device and an accessory device, wherein:

the accessory device is configured to, based on the display device being in a turn-off state and the accessory device being in a turn-on state:

collect to-be-verified fingerprint data;

match the to-be-verified fingerprint data with pre-stored fingerprint data of a user; and send, based on the to-be-verified fingerprint data successfully matching the pre-stored fingerprint data of the user, a first turn-on instruction to the display device through a Bluetooth connection;

the display device is configured to perform a turn-on operation when receiving the first turn-on instruction; and the accessory device is further configured to:

output, based on the to-be-verified fingerprint data failing to match the pre-stored fingerprint data of the user, a first feedback, wherein the first feedback comprises one or more of a vibration feedback, a light feedback, and a sound feedback, wherein the display device comprises a Bluetooth module with a first Bluetooth system and a second Bluetooth system, the first Bluetooth system having reduced functionality comprising receipt of the to-be-verified fingerprint data and link keepalive.

8. The device starting system according to claim 7, wherein, based on the display device being in the turn-off state, the Bluetooth module of the display device uses the first Bluetooth system, and the first Bluetooth system is configured to receive the first turn-on instruction; and wherein, based on the display device being in a turn-on state, the Bluetooth module of the display device uses the second Bluetooth system, and the second Bluetooth system is configured to be paired with the accessory device or an electronic device other than the accessory device.

9. The device starting system according to claim 7, wherein the display device is an all-in-one machine.

10. The device starting system according to claim 7, wherein the accessory device is a Bluetooth keyboard, the Bluetooth keyboard is provided with a fingerprint collection module, and the fingerprint collection module is configured to collect the to-be-verified fingerprint data.

11. The device starting system according to claim 7, wherein the display device is further configured to control, based on receiving the first turn-on instruction, a power module of the display device to supply power to each to-be-started module of the display device.

12. The device starting system according to claim 7, wherein the display device is further configured to turn on a display of the display device based on receiving the first turn-on instruction.

13. The device starting system according to claim 7, wherein the display device is further configured to display a fingerprint enrollment prompt box, the fingerprint enrollment prompt box prompts the user to enroll a fingerprint; and wherein the accessory device is further configured to:

collect fingerprint data using a fingerprint sensor in response to a touch operation on the fingerprint sensor; and perform quality detection on the collected fingerprint data.

14. A device starting system, comprising a display device and an accessory device, wherein:

the accessory device is configured to, based on the display device being in a turn-off state and the accessory device being in a turn-on state, the accessory device is configured to:

collect to-be-verified fingerprint data; and send the to-be-verified fingerprint data to the display device through a Bluetooth connection;

the display device is configured to:

match, based on receiving the to-be-verified fingerprint data, the to-be-verified fingerprint data with pre-stored fingerprint data of a user; and perform, based on the to-be-verified fingerprint data successfully matching the pre-stored fingerprint data of the user, a turn-on operation; and the display device is further configured to:

output, based on the to-be-verified fingerprint data failing to match the pre-stored fingerprint data of the user, a second feedback, wherein the second feedback comprises one or more of a vibration feedback, a light feedback, and a sound feedback, wherein the display device comprises a Bluetooth module with a first Bluetooth system and a second Bluetooth system, the first Bluetooth system having reduced functionality comprising receipt of the to-be-verified fingerprint data and link keepalive.

15. The device starting system according to claim 14, wherein, based on the display device being in the turn-off state, the Bluetooth module of the display device uses the first Bluetooth system; and wherein, based on the display device being in a turn-on state, the Bluetooth module of the display device uses the second Bluetooth system, and the second Bluetooth system is configured to be paired with the accessory device or an electronic device other than the accessory device.

16. The device starting system according to claim 14, wherein the display device is an all-in-one machine.

17. The device starting system according to claim 14, wherein the accessory device is a Bluetooth keyboard, the Bluetooth keyboard is provided with a fingerprint collection module, and the fingerprint collection module is configured to collect the to-be-verified fingerprint data.

18. The device starting system according to claim 14, wherein the display device is further configured to control, based on the to-be-verified fingerprint data successfully matching the pre-stored fingerprint data of the user, a power module of the display device to supply power to each to-be-started module of the display device.

19. The device starting system according to claim 14, wherein the display device is further configured to turn on, based on the to-be-verified fingerprint data successfully matching the pre-stored fingerprint data of the user, a display of the display device.

20. The device starting system according to claim 7, wherein the display device is configured to display a fingerprint enrollment prompt box, and the fingerprint enroll-ment prompt box prompts the user to enroll a fingerprint; and wherein the accessory device is further configured to:

collect fingerprint data using a fingerprint sensor in response to a touch operation on the fingerprint sensor; and perform quality detection on the collected fingerprint data.

* * * * *